United States Patent
Usami

(10) Patent No.: US 12,296,582 B2
(45) Date of Patent: May 13, 2025

(54) IMAGE FORMING APPARATUS AND METHOD FOR DETERMINING

(71) Applicant: BROTHER KOGYO KABUSHIKI KAISHA, Nagoya (JP)

(72) Inventor: Hajime Usami, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 162 days.

(21) Appl. No.: 18/328,201

(22) Filed: Jun. 2, 2023

(65) Prior Publication Data

US 2023/0391074 A1 Dec. 7, 2023

(30) Foreign Application Priority Data

Jun. 3, 2022 (JP) ................. 2022-091119

(51) Int. Cl.
*B41J 2/045* (2006.01)
*G06K 15/00* (2006.01)
*G06K 15/02* (2006.01)
*G06T 7/00* (2017.01)

(52) U.S. Cl.
CPC ......... *B41J 2/0451* (2013.01); *B41J 2/04586* (2013.01); *G06K 15/02* (2013.01); *G06K 15/408* (2013.01); *G06T 7/0002* (2013.01); *G06K 2215/0085* (2013.01); *G06K 2215/101* (2013.01); *G06T 2207/30144* (2013.01)

(58) Field of Classification Search
CPC ..... B41J 2/0451; B41J 2/04586; G06K 15/02; G06K 15/408; G06K 2215/0085; G06K 2215/101; G06T 7/0002; G06T 2207/30144
See application file for complete search history.

(56) References Cited

U.S. PATENT DOCUMENTS

2017/0021612 A1* 1/2017 Yamanobe ............... B41J 29/38

FOREIGN PATENT DOCUMENTS

JP 2000043330 A 2/2000
JP 2019181768 A 10/2019

* cited by examiner

*Primary Examiner* — Thinh H Nguyen
(74) *Attorney, Agent, or Firm* — Element IP, PLC

(57) ABSTRACT

A printing apparatus, having a plurality of heads, a plurality of head controlling circuits, a master transmitter, and a determining unit, is provided. The head controlling circuits are connected to the heads in one-to-one correspondence and are connected with one another serially. Each head controlling circuit controls a corresponding one of the heads to record a part of the image based on master data. The master transmitter transmits the master data to a most upstream one of the head controlling circuits. The head controlling circuits are configured to pass the master data received by the most upstream one of the head controlling circuits serially downstream onto a most downstream one of the head controlling circuits, and generate differential data indicating a difference between the master data and read data generated by reading an image. The determining unit determines whether the image contains a defect based on the differential data.

10 Claims, 17 Drawing Sheets

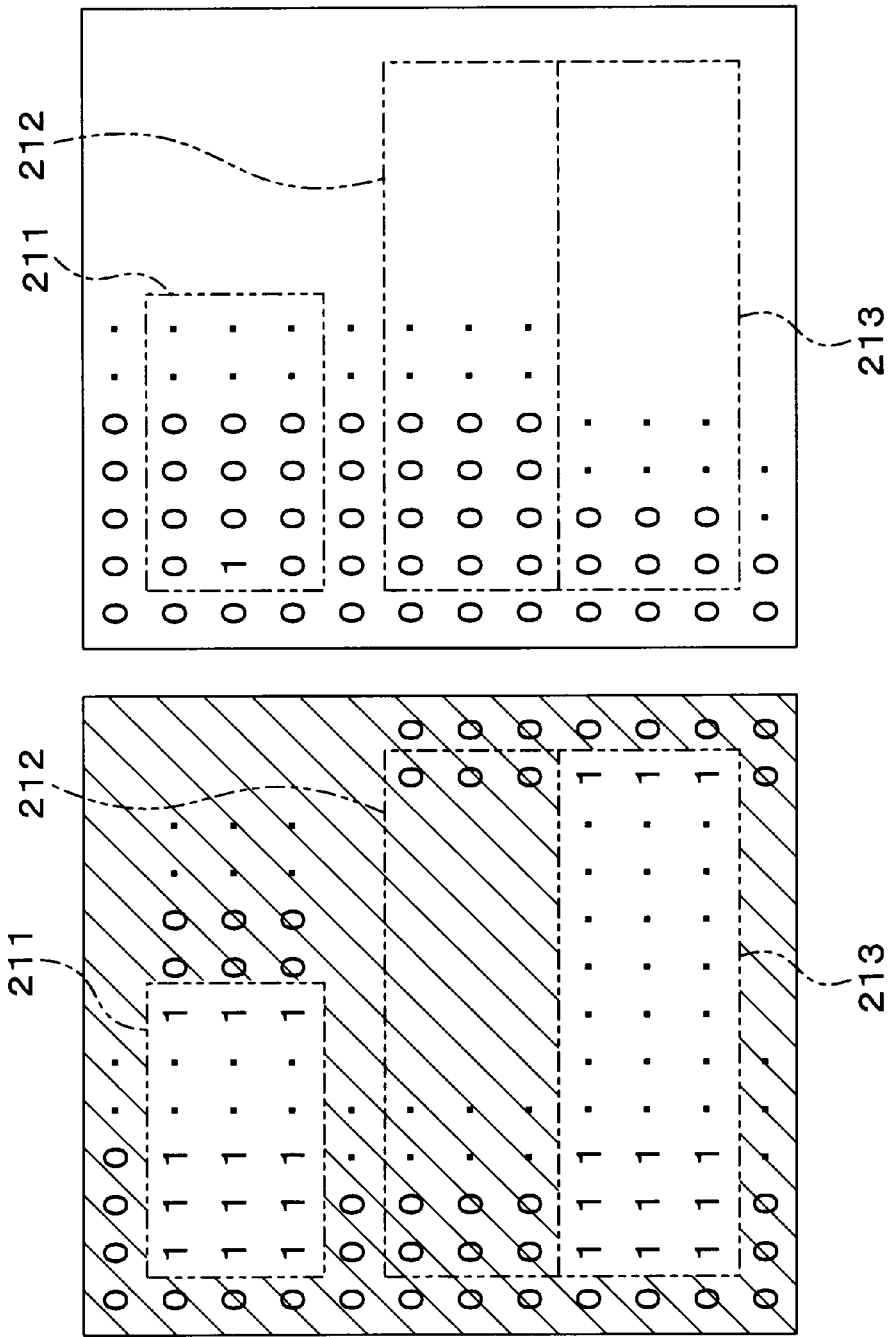

FIG. 16A

FIG. 16B

IMAGE FORMING APPARATUS AND METHOD FOR DETERMINING

REFERENCE TO RELATED APPLICATIONS

This application claims priority from Japanese Patent Application No. 2022-091119 filed on Jun. 3, 2022. The entire content of the priority application is incorporated herein by reference.

BACKGROUND ART

An inkjet recording apparatus being a type of printing apparatus may record an image on a sheet based on master image data by conveying the sheet and operating an inkjet head to eject ink at the sheet being conveyed, and may discharge the sheet outside.

The inkjet recording apparatus may read an image recorded on the sheet before the sheet is discharged outside and generate outcome-image data expressing the recorded outcome. A controller unit in the inkjet recording apparatus may compare the outcome-image data with the master image data. The comparison may indicate a substantial difference between the outcome image data and the master image data, and the difference may mean that the image recorded on the sheet contains a defect, or unintended outcome, e.g., smears, spots, etc. In this occasion, the inkjet recording apparatus may record a mark indicating that the outcome contains a defect on the sheet and discharge the sheet with the mark. Thereafter, the inkjet recording apparatus may repetitively record the image based on the same master image data on a new sheet.

DESCRIPTION

The inkjet recording apparatus may have a plurality of heads aligning in a widthwise direction of the sheet, e.g., a direction orthogonal to a conveying direction, a plurality of head-controlling circuits connected to the plurality of heads in one-to-one correspondence, and a main controlling circuit. The heads in the inkjet recording apparatus may not be movable in the widthwise direction but may be fixed at a position in the inkjet recording apparatus. In this arrangement, the inkjet printing apparatus may record an image on a sheet having a greater width in a shorter period of time. In order to determine whether the recorded image contains a defect, the main controlling circuit may compare the outcome-image data with the master image data. In this regard, when the inkjet recording apparatus has a larger number of heads, a volume of the outcome-image data may increase, and the larger volume of image data may increase computing load on the main controlling circuit.

The present disclosure is advantageous in that an image forming apparatus, in which computing load on a main controlling circuit is reducible, and a method to determine whether a defect is contained in a recorded image with the reduced computing load are provided.

Figure 1:
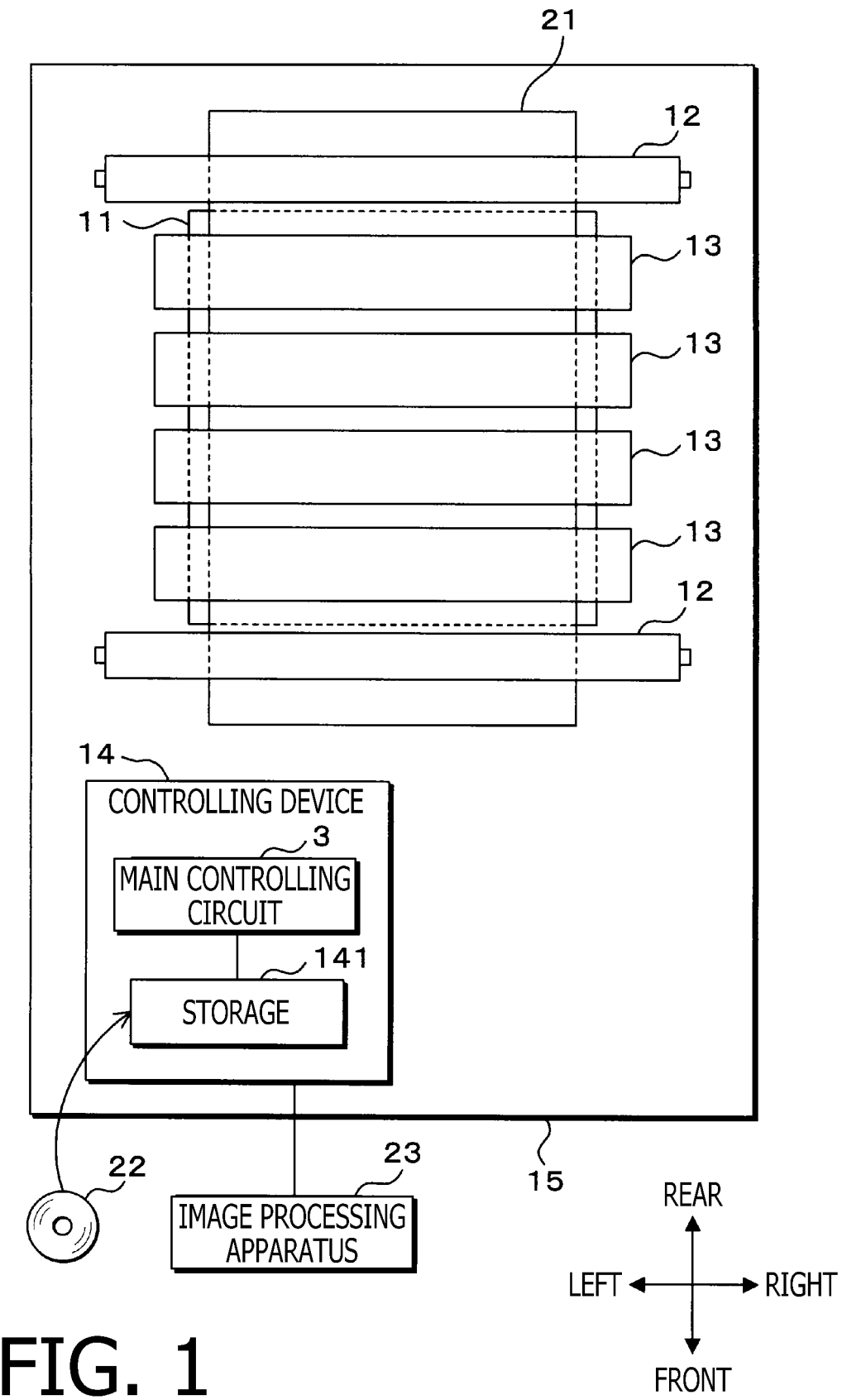
Figure 2:
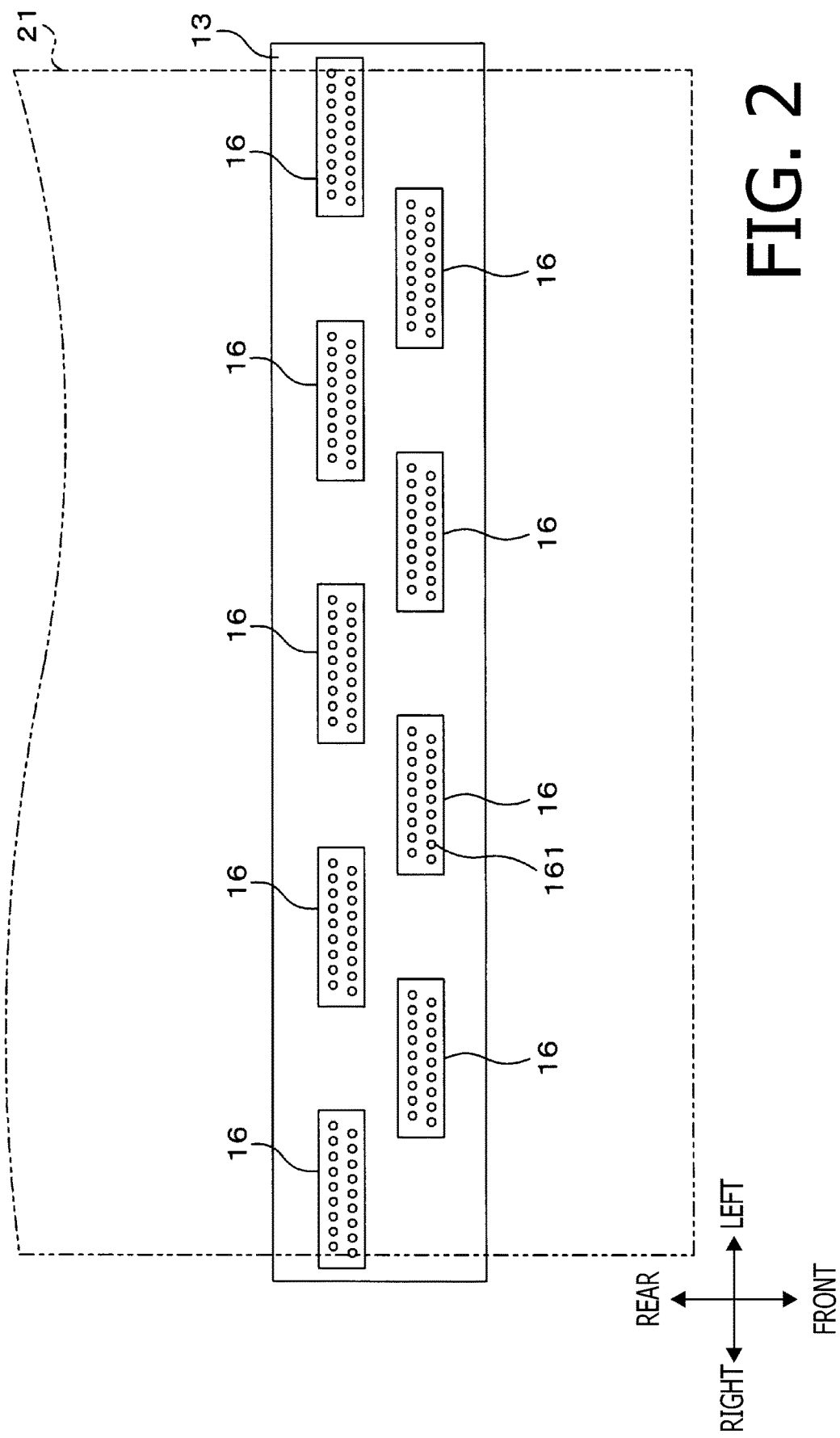
Figure 3:
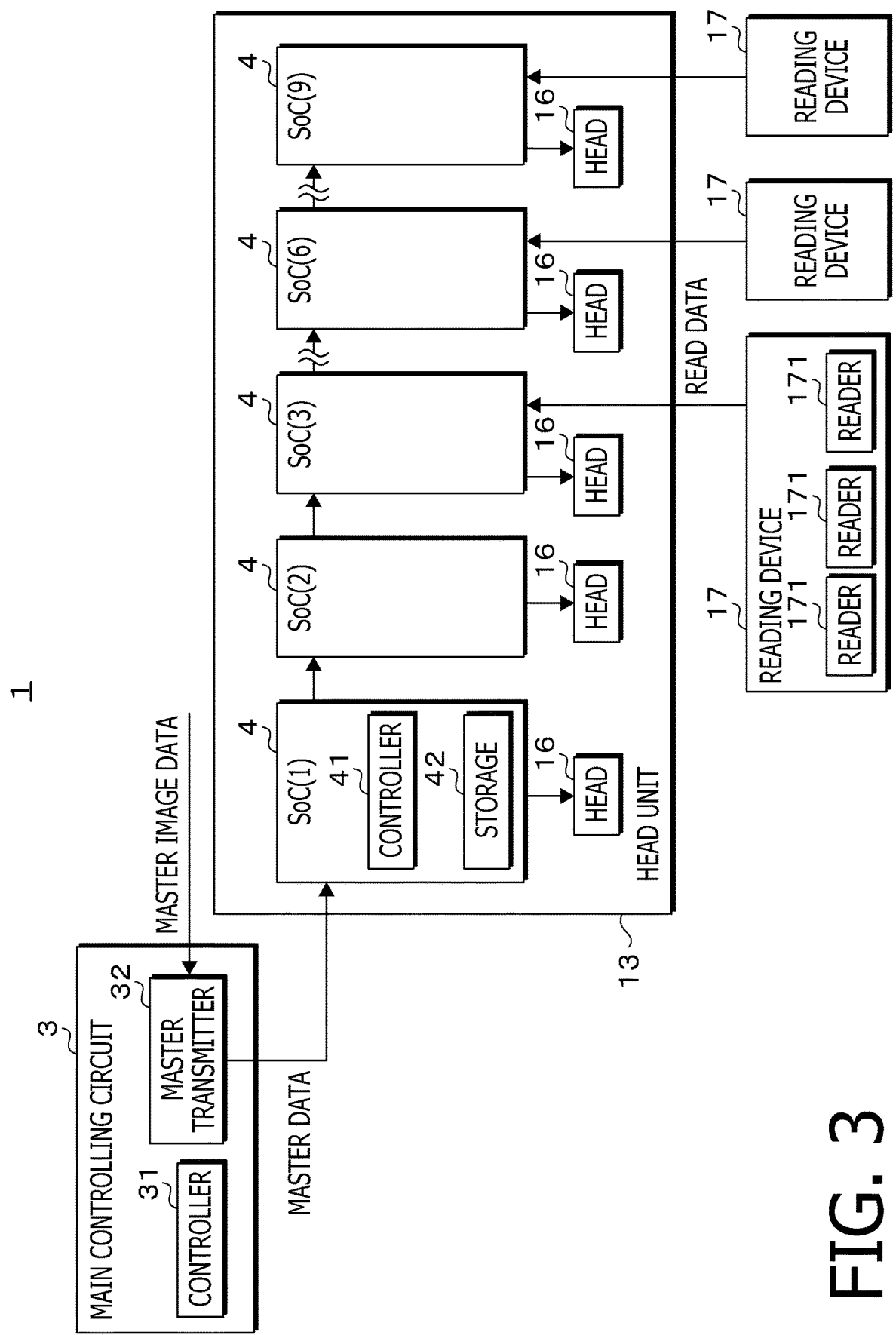
Figure 4:
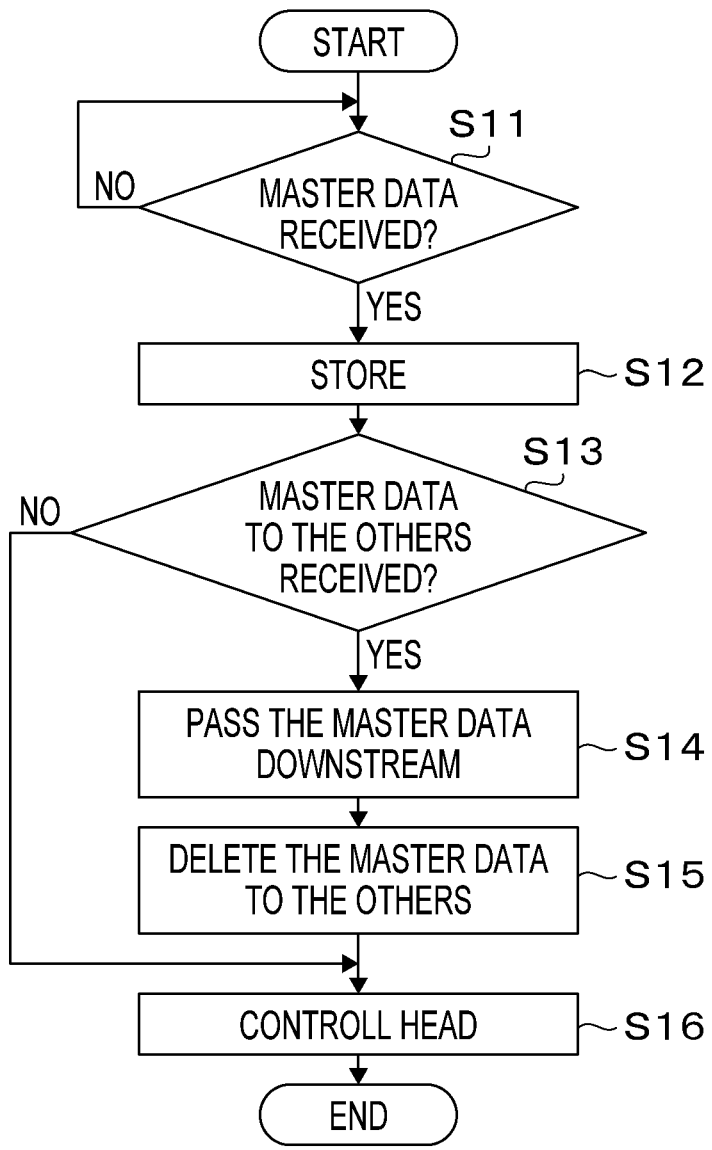
Figure 5:
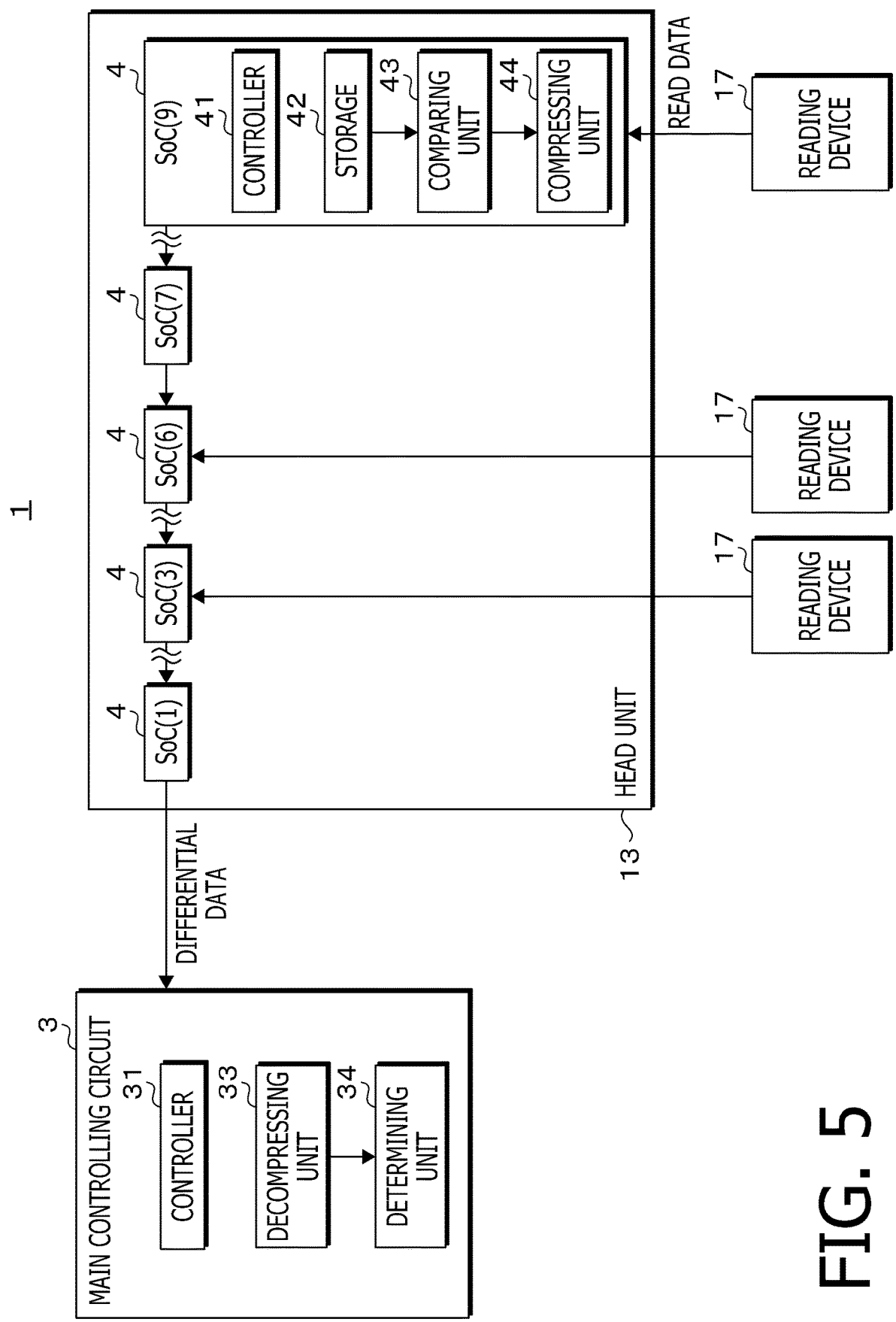
Figure 6:
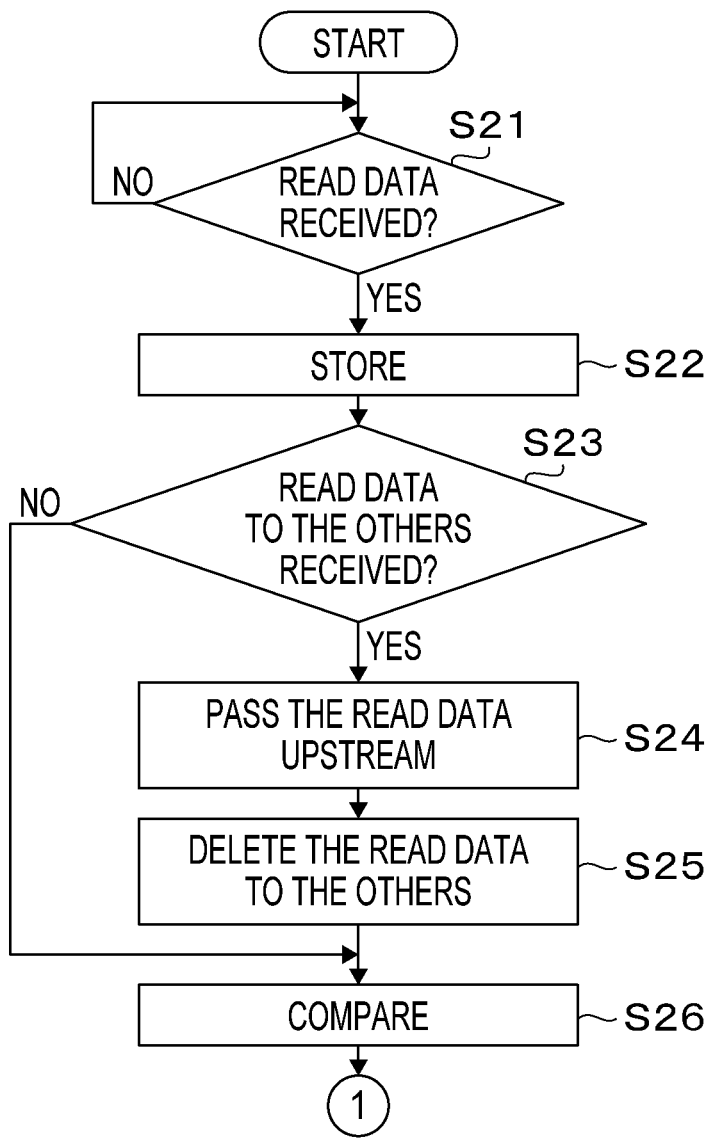
Figure 7:
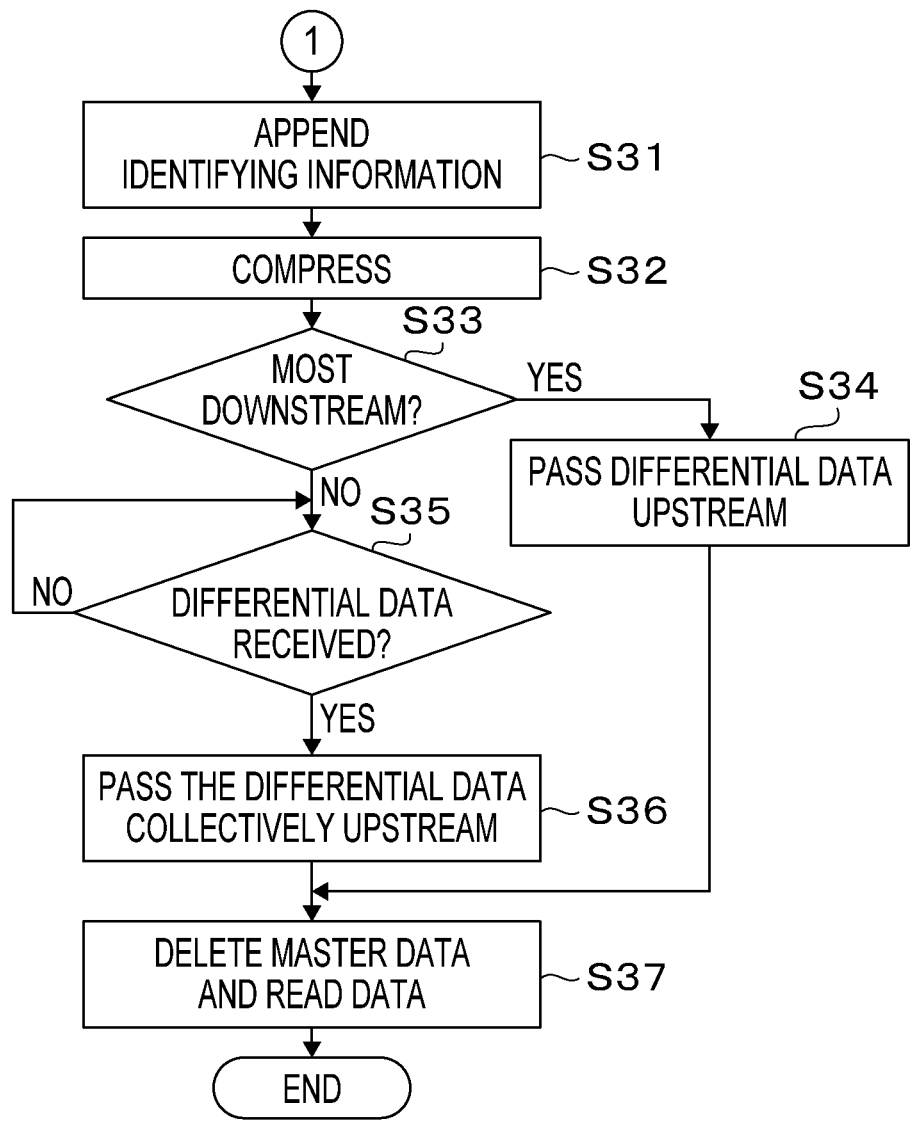
Figure 8:
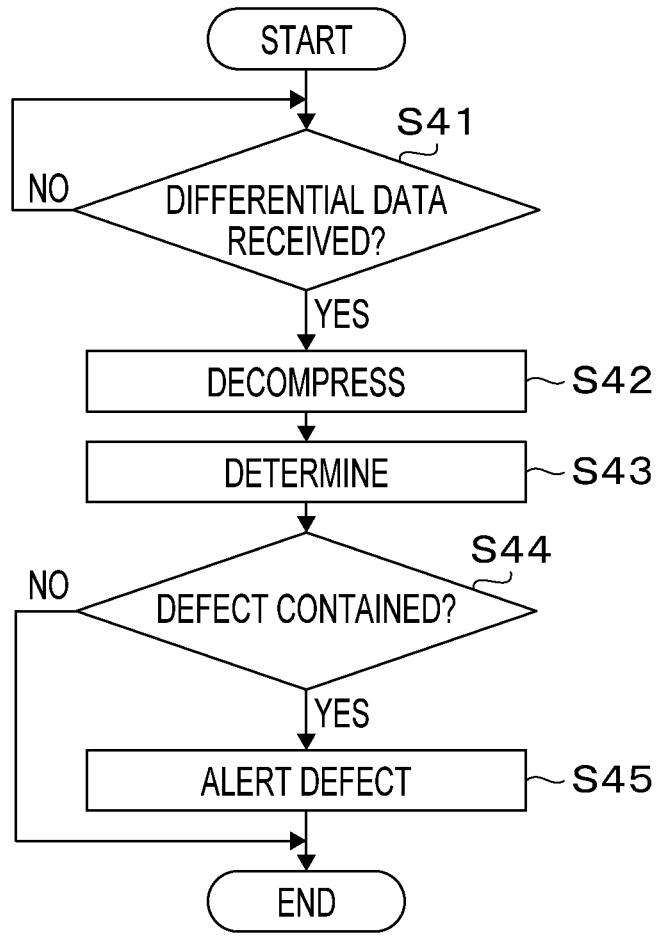
Figure 9:
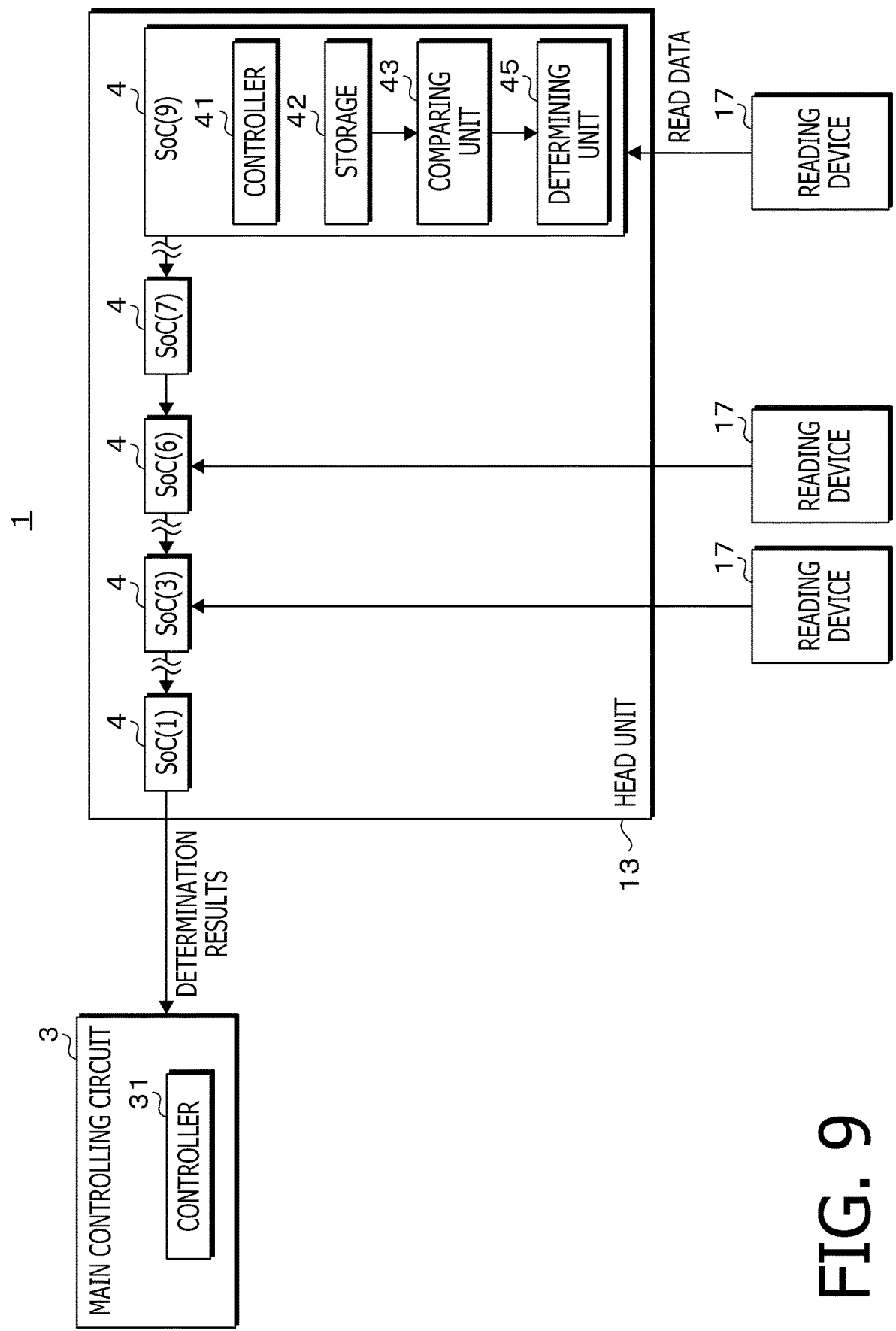
Figure 10:
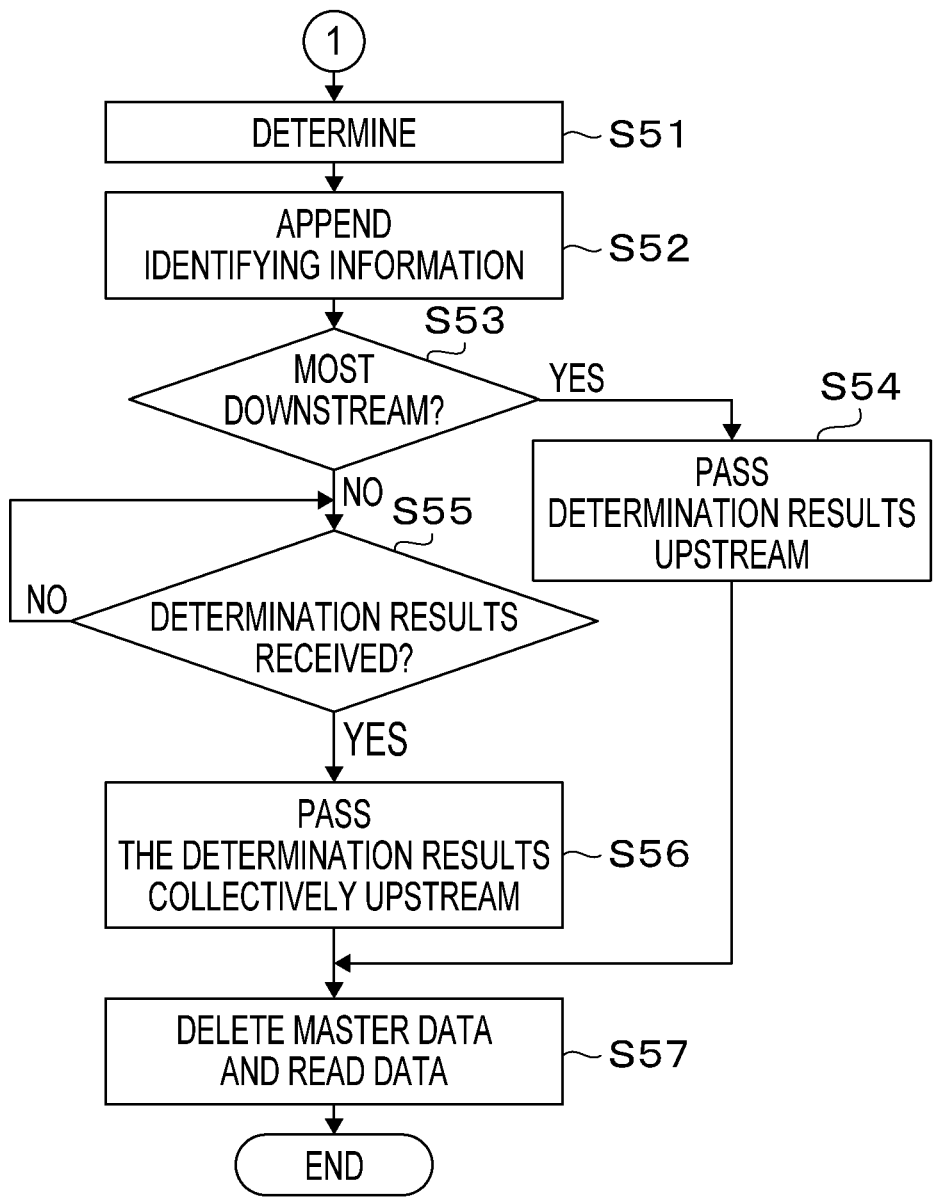
Figure 11:
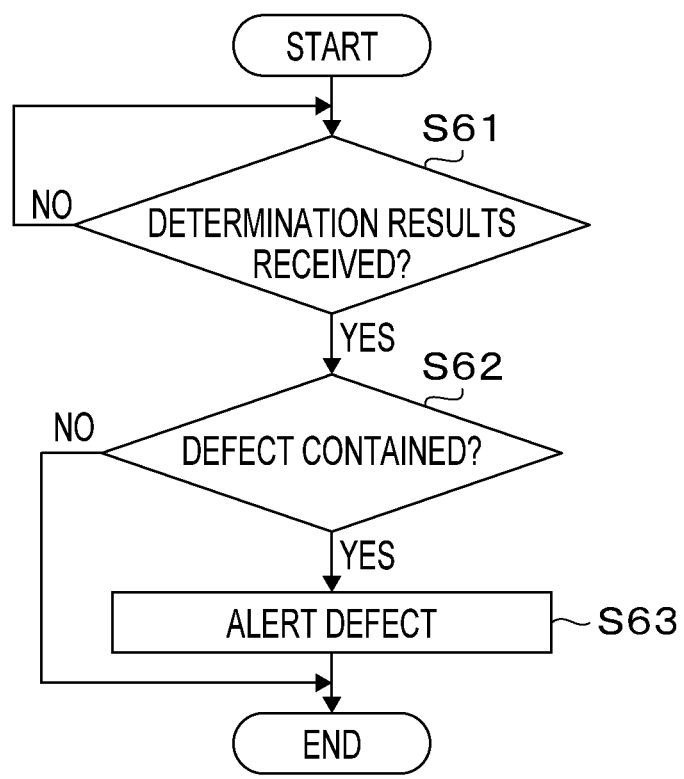
Figure 12:
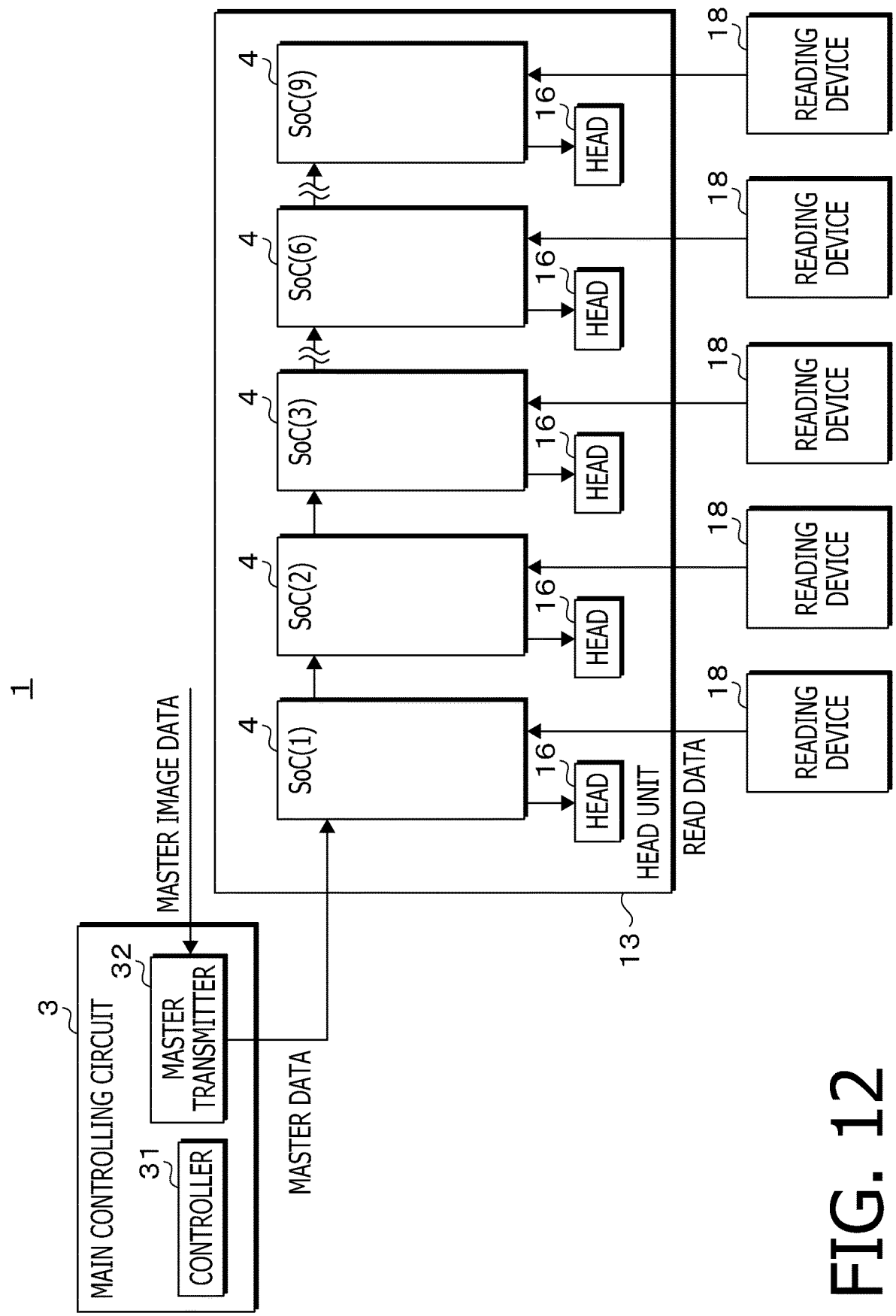
Figure 13:
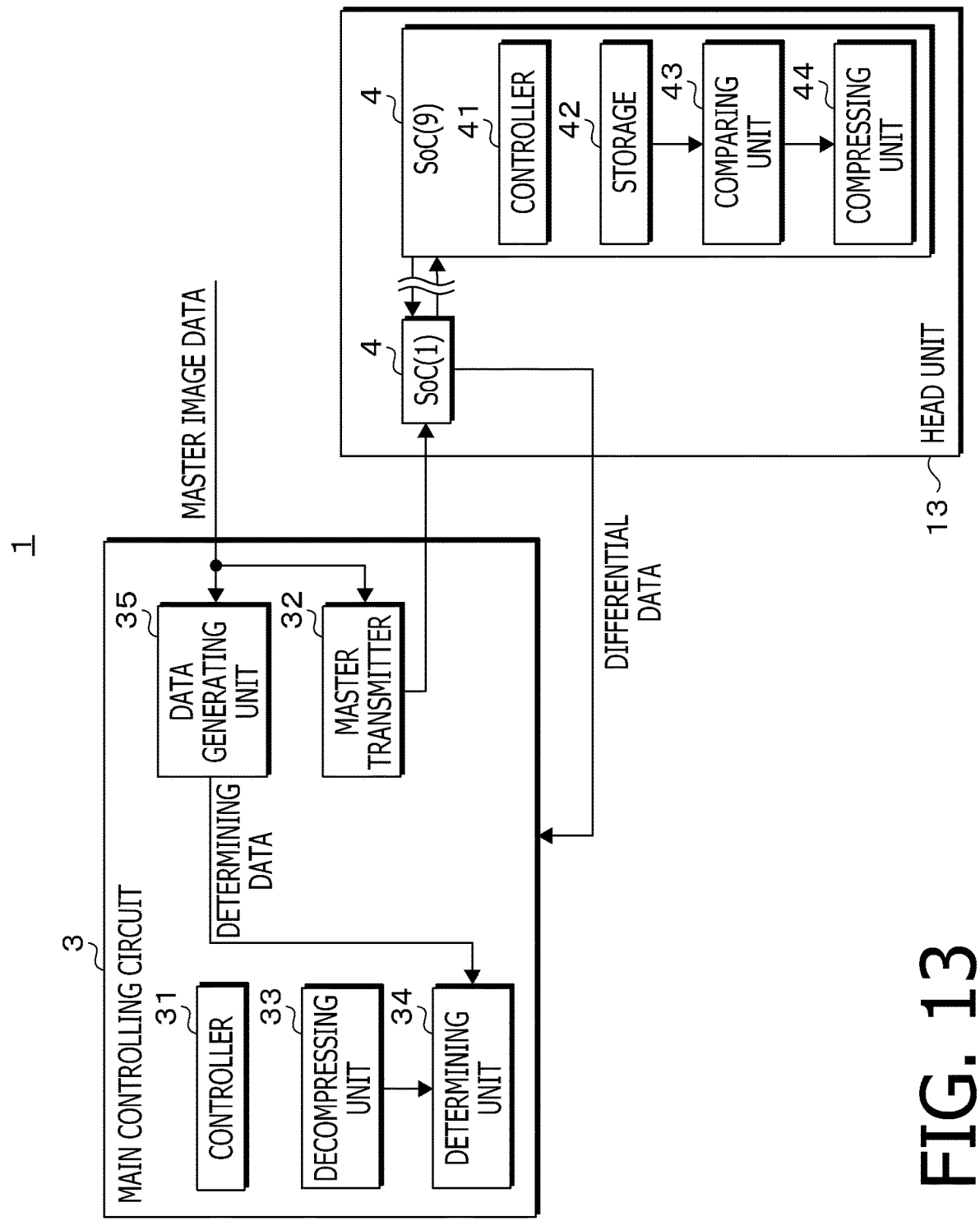
Figures 14A, 14B:
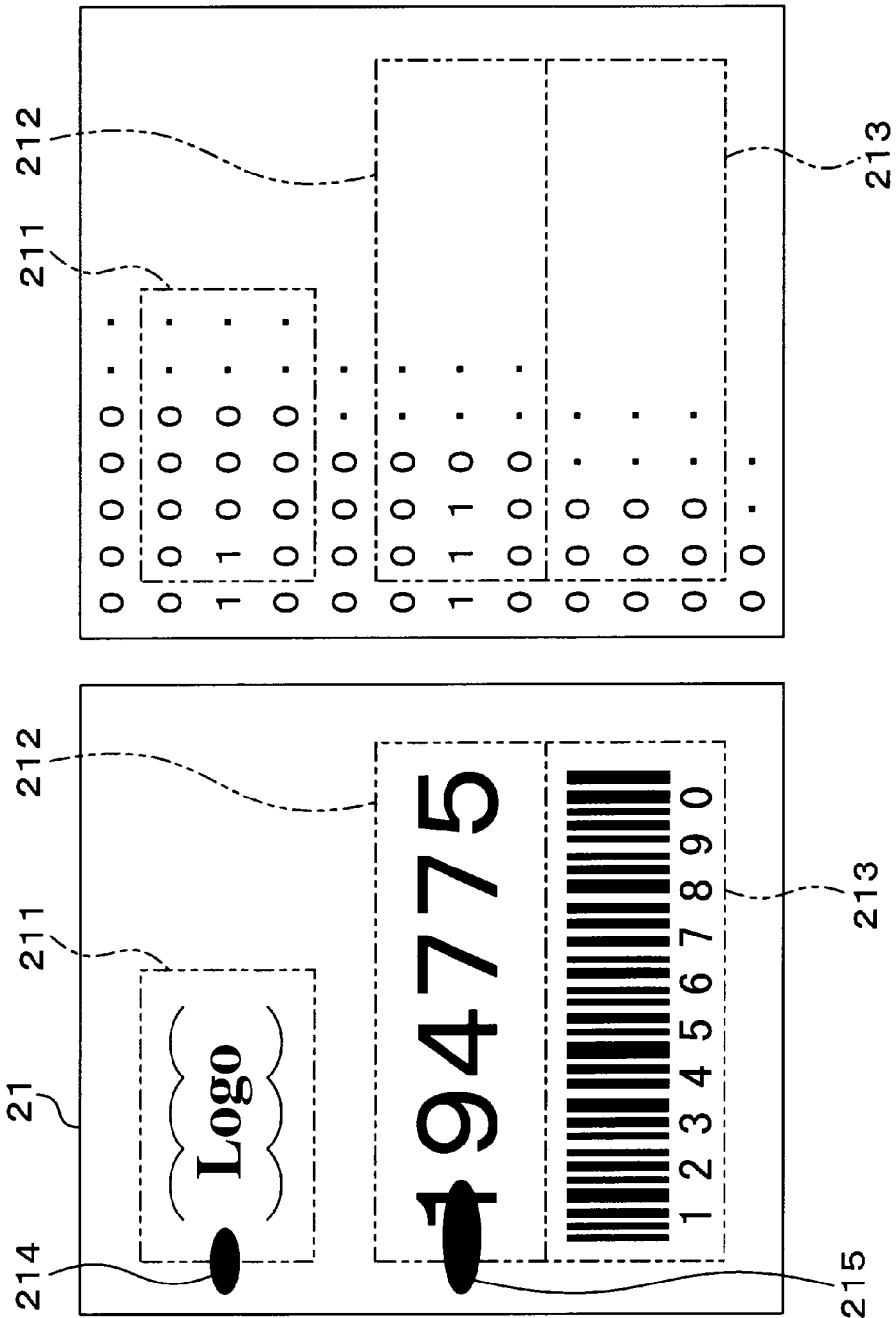
Figure 17:
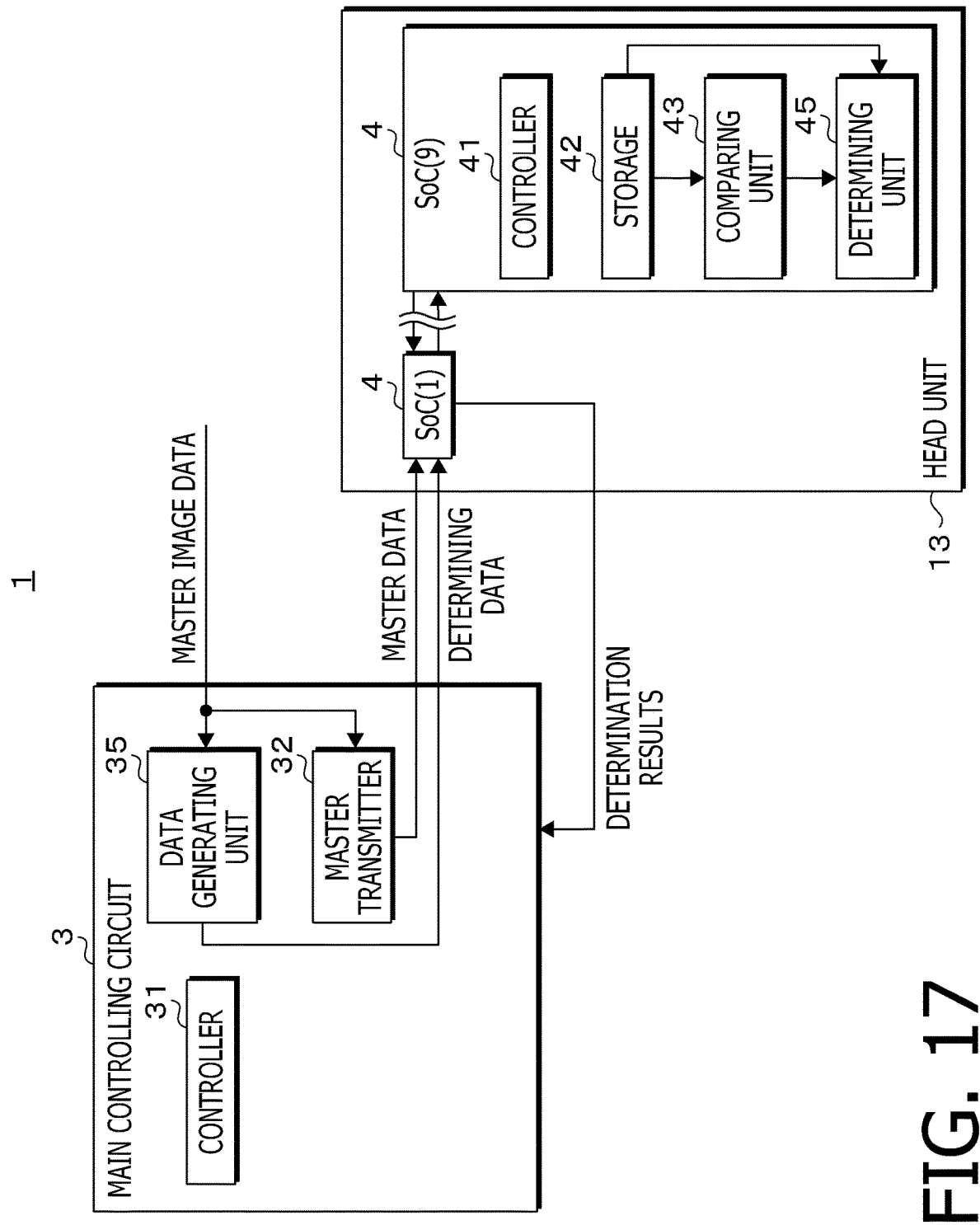

FIG. 1 is a schematic plan view of a printing apparatus.
FIG. 2 is a bottom view of a head unit.
FIG. 3 is a block diagram to illustrate a main controlling circuit and the head unit.
FIG. 4 is a flowchart to illustrate a flow of printing process to be executed in SoCs.
FIG. 5 is a block diagram to illustrate a configuration for detecting a defect in an image.
FIG. 6 is a flowchart to illustrate a part of a data-exchange process to be executed in the Socs.
FIG. 7 is a flowchart to illustrate another part of the data-exchange process to be executed in the Socs.
FIG. 8 is a flowchart to illustrate a determining flow to be executed in the main controlling circuit.
FIG. 9 is a block diagram to schematically illustrate a main configuration in a printing apparatus.
FIG. 10 is a flowchart to illustrate a part of a data-exchange process to be executed in the SoCs.
FIG. 11 is a flowchart to illustrate a determining flow to be executed in the main controlling circuit.
FIG. 12 is a block diagram to schematically illustrate a main configuration in a printing apparatus.
FIG. 13 is a block diagram to schematically illustrate a configuration in a printing apparatus.
FIGS. 14A-14B are schematic diagrams to illustrate differential data.
FIGS. 15A-15B are schematic diagrams to illustrate determining data.
FIGS. 16A-16B are schematic diagrams to illustrate differential data to be used in a printing apparatus.
FIG. 17 is a block diagram to schematically illustrate a main configuration in a printing apparatus.

Embodiments of the present disclosure will be described below. In the following paragraphs, directions in a printing apparatus 1 are defined with reference to orientations indicated as right, left, front, and rear by bidirectionally pointing arrows shown in FIG. 1. A front-to-rear or rear-to-front direction may be called a front-rear direction, an up-to-down or down-to-up direction may be called a vertical direction, and a left-to-right or right-to-left direction may be called a widthwise direction.

First Embodiment

FIG. 1 is a schematic plan view of the printing apparatus 1. The printing apparatus 1 may be, for example, an inkjet recording apparatus. The printing apparatus 1 may convey a sheet 21 and record an image based on master image data on the sheet 21 being conveyed. The printing apparatus 1 has a platen 11, two (2) conveyer rollers 12, four (4) head units 13, a controlling device 14, and a case 15. The platen 11, the conveyer rollers 12, the head units 13, and the controlling device 14 are accommodated in the case 15.

The platen 11 is a table with a surface facing upward to support the sheet 21 being conveyed from below. The sheet 21 may be conveyed from a sheet feeder, which not shown but is located outside the case 15, to the upper surface of the platen 11 in an orientation such that plane surfaces thereof face upward and downward and widthwise edges thereof face leftward and rightward. The conveyer rollers 12 are located at positions frontward and rearward of the platen 11 with axes thereof aligning in the widthwise direction. The conveyer rollers 12 may be driven by a motor, which is not shown, to apply a conveying force to convey the sheet 21 frontward. Thus, the sheet 21 may be conveyed frontward on the upper surface of the platen 11.

The four head units 13 are aligned in the front-rear direction between the conveyer rollers 12. The head units 13 are so-called line-styled inkjet heads. Each head unit 13 has a cylindrical form, of which axis extends in the widthwise direction. The head units 13 are located apart from the upper surface of the platen 11 to face the upper surface of the platen 11. The sheet 21 may be conveyed through an area between the platen 11 and the head units 13. The head units 13 are each supplied with ink in different colors from ink tanks, which are not shown.

The controlling device 14 has a main controlling circuit 3. The main controlling circuit 3 is a controlling core of the printing apparatus 1. The main controlling circuit 3 may include, for example, but not necessarily be limited to, FPGA, or, for another example, ASIC.

The controlling device 14 further includes a storage 141. The storage 141 is a rewritable memory and may include, for example, EEPROM, Flash ROM, and hard disk drive. The storage 141 stores controlling programs. The controlling programs may be transported from a recordable medium 22, such as optical disk and removable flash memory, and/or may be downloaded from a server, which may communicate with the printing apparatus 1.

The controlling device 14 may communicate with an image processing apparatus 23. The image processing apparatus 23 may be, for example, a PC or a scanner, and may transmit master image data, composing an image to be recorded on the sheet 21, to the controlling device 14. The main controlling circuit 3 may control behaviors of devices in the printing apparatus 1 according to the controlling programs stored in the storage 141 and based on the master image data received from the image processing apparatus 23. Under the control by the main controlling circuit 3, the inks may be ejected from the head units 13, and the image may be recorded in the ejected inks on the sheet 21. The sheet 21 with the image recorded thereon may be discharged in a tray, which is not shown but may be located outside the case 15.

FIG. 2 is a bottom view of one of the head units 13. Each head unit 13 has a plurality of heads 16. FIG. 2 illustrates nine (9) heads 16. The heads 16 are arrayed alternately along the widthwise direction. In particular, the heads 16 are arrayed in two (2) rows, which are apart from each other in the front-rear direction, and in each row, five (5) or four (4) heads 16 are aligned linearly in the widthwise direction. In the present embodiment, the frontward row includes four heads 16, and the rearward row includes five heads 16. The heads 16 in the frontward row and the heads 16 in the rearward row are in a staggered arrangement.

Each head 16 has a plurality of nozzles 161, which are arrayed in a staggered arrangement along the widthwise direction. The nozzles 161 are formed on a lower face of the head unit 13 and are open downward. The ink in the head 16 may be ejected at the sheet 21 and land on the sheet 21 to record an image on the sheet 21. Among the entire nozzles 161 formed in each head unit 13, a nozzle 161 located on a leftward end may face a leftward end area of a sheet 21 in a predetermined size, and a nozzle 161 located on a rightward end may face a rightward end area of the sheet 21 in the predetermined size. In this arrangement, without moving the heads 16 in the widthwise direction, the image may be recorded on the sheet 21 in the predetermined size having a predetermined width in a shorter period of time.

In the description below, when the nine heads 16 need to be identified respectively, a most leftward one of the heads 16 may be called a first head 16, and a head 16 located at a front-rightward position with respect to the first head 16 may be called a second head 16. A head 16 located at a rear-rightward position with respect to the second head 16 may be called a third head 16, and a head 16 located at a front-rightward position with respect to the third head 16 may be called a fourth head 16. Further, the five heads 16 located rightward with respect to the fourth head 16 may be called a fifth head 16, a sixth head 16, a seventh head 16, an eighth head 16, and a ninth head 16, respectively, in an order from right to left.

FIG. 3 is a block diagram to illustrate the main controlling circuit 3 and one of the head units 13. In the following paragraphs, while configurations of the four head units 13 are identical, solely one of the head units 13 representing the four head units 13 will be described.

The head unit 13 has a plurality of SoCs 4. A quantity of the SoCs 4 is equal to the quantity of the heads 16 included in the head unit 13. In other words, nine (9) SoCs 4 are provided in the head unit 13. The SoCs 4 are connected to the heads 16 in one-to-one correspondence. Each SoC 4 is a head-controlling circuit, which may control image-recording behaviors of the head 16 connected thereto. Each SoC 4 has unique identifying information assigned in advance. In the following paragraphs, an SoC 4 connected with the K-th head 16 will be called the K-th SoC 4, whereas K represents a natural number smaller than or equal to 9. Labels "SoC (K)" appearing in FIG. 3 each mean "K-th SoC 4."

The first through ninth SoCs 4 are arranged in line in this given order and are connected with one another serially. In particular, each SoC 4 has an upstream interface (I/F) and a downstream I/F, which are not shown, and the downstream I/F of the first SoC 4 and the upstream I/F of the second SoC 4 are connected through a communication cable for duplex communication. Similarly, the downstream I/F of the K-th SoC 4 and the upstream I/F of the (k+1)th SoC 4 are connected through a communication cable for duplex communication, whereas k represents a natural number greater than or equal to 2 and smaller than or equal to 8. The upstream I/F of the first SoC 4 is connected to an I/F (not shown) in the main controlling circuit 3.

Thus, the k-th SoC 4 is, generally, connected upstream to the (k−1)th SoC 4 and downstream to the (k+1)th SoC 4. Meanwhile, the first SoC 4 is connected upstream to the main controlling circuit 3, and the ninth SoC 4 is not connected downstream with any SoC 4.

The main controlling circuit 3 includes a controller 31 and a master transmitter 32. The master transmitter 32 and the first SoC 4 are connected with each other through a communication cable for duplex communication. The controller 31 may receive master image data from an image processing apparatus 23 and input the master image data to the master transmitter 32. The master transmitter 32 may divide the master image data input from the controller 31 according to a predetermined protocol to generate a plurality of units of master data to be provided to the plurality of SoCs. Further, the master transmitter 32 may append the identifying information of each SoC 4, to which a unit of master data is assigned, to each unit of the master data. Moreover, the master transmitter 32 may transmit nine units of master data, i.e., a unit of master data with the identifying information of the first SoC 4 appended thereto, a unit master data with the identifying information of the second SoC 4 appended thereto, . . . and a unit of master data with the identifying information of the ninth SoC 4 appended thereto, to the first SoC 4.

The nine units of master data are passed from the first SoC 4, which is the most upstream SoC 4 among all of the SoCs 4, through the second, third, fourth, fifth, seventh, and eighth SoCs 4, to the ninth SoC 4, which is the most downstream SoC 4 among all of the SoCs 4, sequentially. In other words, between two adjoining SoCs 4 that are connected serially, the upstream one of the SoCs 4 is a sender SoC 4, and the downstream one of the SoCs 4 is a receiver SoC 4. According to the present embodiment, the most upstream SoC 4 is the SoC 4 directly connected to the main controlling circuit 3.

Each of the SoCs 4 has a controller 41 and a storage 42. The controller 41 may control acts of the SoC 4, to which the controller 41 belongs. The controller 41 may include, for example, a CPU and/or a logic circuit such as an image processing circuit. The storage 42 is a rewritable non-volatile memory such as, for example, Flash ROM and EEPROM. The storage 42 is provided with the identifying information of the SoC 4, to which the storage 42 belongs, in advance. In the following paragraphs, in a subjective view from the SoC 4, the identifying information to identify itself stored in the storage 42 may be referred to as "its own identifying information" or "identifying information assigned thereto." Further, the unit of master data, to which its own identifying information is appended, may be referred to as "master data addressed thereto."

FIG. 4 is a flowchart to illustrate a flow of printing process to be executed in each of the SoCs 4. The controller 41 in the SoC 4 determines whether the master data is received from the main controlling circuit 3 or the upstream SoC 4 (S11). If no master data is received (S11: NO), the controller 41 repeats S11. If the master data is received (S11: YES), the controller 41 stores all of the received units of master data in the storage 42 (S12).

Next, the controller 41 determines whether the controller 41 received units of master data addressed to the other SoCs 4 than itself. In other words, the controller 41 determines whether the master data in the storage 42 stored in S12 contains one or more unit(s) of master data with identifying information different from its own identifying information. If the controller 41 determines that the controller 41 received unit(s) of master data addressed to the other SoC(s) 4 (S13: YES), the controller 41 passes the unit(s) of master data addressed to the other SoC(s) 4 among the units of master data stored in the storage 42 onto the downstream SoC 4 (S14). The controller 41 deletes the unit(s) of master data addressed to the other SoC(s) 4 from the storage 42 (S15).

Following S15, or if the controller 41 received no master data assigned to the other SoC(s) 4 (S13: NO), the controller 41 proceeds to S16, which will be described later. Optionally, in S14, the controller 41 may pass all of the units of master data received in S11 onto the downstream SoC 4; however, the controller 41 may reduce a volume of the data to be transmitted to the downstream SoC 4 by omitting the unit of master data addressed thereto so that communication load may be reduced.

Based on the unit of master data addressed thereto, the controller 41 controls the head 16, which is connected thereto, to eject the ink from the nozzles 161 selectively. Accordingly, an image is recorded on the sheet 21. In other words, the SoC 4 controls image recording with the head 16 based on the master data assigned thereto. After S16, the controller 41 ends the printing process. After the printing process is ended, the storage 42 may maintain the unit of master data addressed thereto without deleting.

Meanwhile, there may be a case such that the image recorded on the sheet 21 contains defect(s) due to, for example, aged deterioration of the heads 16, stains, or smears. The defects may include, for example, blank spots in the image due to the ink not ejected correctly from the nozzles 161 and stains of the ink landing on incorrect positions on the sheet 21. In this regard, the printing apparatus 1 may detect the defects in the image appearing on the sheet 21.

As shown in FIG. 3, the printing apparatus 1 further has a plurality of reading devices 17. A quantity of the reading devices 17 is smaller than or equal to a half of the quantity of the SoCs 4 and may be, in the present embodiment, three (3). In the following paragraphs, the three reading devices 17 may be identified by being referred to as an upstream reading device 17, a midstream reading device 17, and a downstream reading device 17. Each of the reading devices 17 is provided to three (3) adjoining SoCs 4. In particular, the upstream reading device 17 is provided correspondingly to the first through third SoCs 4, the midstream reading device 17 is provided correspondingly to the fourth through sixth SoCs 4, and the downstream reading device 17 is provided correspondingly to the seventh through ninth SoCs 4.

Each reading device 17 has three (3) readers 171. Each reader 171 may read the image recorded on the sheet 21 before the sheet 21 with the image is discharged into the tray and may generate a unit of read data composing the image recorded on the sheet 21.

The three readers 171 in the upstream reading device 17 are located at positions corresponding to the first through third heads 16, respectively, and are connected with one another serially. Among the first through third SoCs 4 that correspond to the upstream reading device 17, the upstream reading device 17 is connected with the third SoC 4. Although not shown in the drawings, the three reading devices 17 in the midstream reading device 17 are located at positions corresponding to the fourth through sixth heads 16 and are connected with one another serially. Among the fourth through sixth SoCs 4 that correspond to the midstream reading device 17, the midstream reading device 17 is connected with the sixth SoC 4. The three reading devices 17 in the downstream reading device 17 are located at positions corresponding to the seventh through eighth heads 16 and are connected with one another serially. Among the seventh through ninth SoCs 4 that correspond to the midstream reading device 17, the midstream reading device 17 is connected with the ninth SoC 4. Thus, the upstream reading device 17, the midstream reading device 17, and the downstream reading device 17 are connected with the third SoC 4, the sixth SoC 4, and the ninth SoC 4, respectively. In other words, the three reading devices 17 are connected with three of the SoCs 4, which includes the most downstream one of the SoCs 4, in one-to-one correspondence.

The three reading devices 17 therefore have nine (9) readers 171 in total, and the nine readers 171 correspond to the nine heads 16. Each of the readers 171 may read an image in a range in the image recorded by the head 16 corresponding thereto. While each reading device 17 has the three readers 171, the reading device 17 is connected to the SoC 4, which is one of the three grouped SoCs 4. In this arrangement, the SoCs 4 and the readers 171 are not connected with each other in one-to-one correspondence. Therefore, it is not necessary to prepare communication cables to connect the SoCs 4 to the readers 171 respectively. In other words, a quantity of the communication cables may be reduced from nine to three.

In the following paragraphs, the reader 171 corresponding to the K-th SoC 4 may be referred to as the K-th reader 171. The K-th reader 171 has a storage (not shown), in which the identifying information of the K-th SoC 4 is stored in advance.

The m-th reader 171 may, whereas "m" is one of 1, 4, and 7, generate a unit of read data, append the identifying information of the m-th SoC 4 to the generated read data unit, and pass the read data unit with the identifying information appended thereto to the (m+1)th reader 171. The (m+1)th reader 171 may generate a unit of read data, append the identifying information of the (m+1)th SoC 4 to the generated read data unit, and pass the read data unit with the identifying information appended thereto together with the read data unit received from the m-th reader 171 to the (m+2)th reader 171. The (m+2)th reader 171 may generate a unit of read data, append the identifying information of the (m+2)th SoC 4 to the generated read data unit, and transmit the generated read data unit with the identifying information appended thereto together with the read data units received from the (m+1)th reader 171 to the (m+2)th SoC 4. Thus, three (3) units of read data may be transmitted from the upstream reading device 17 to the third SoC 4.

The three units of read data transmitted from the upstream reading device 17 to the third SoC 4 correspond to the three (3) units of master data stored in the storages 42 in the first through third SoCs 4, respectively. Similarly, the three (3) units read data units transmitted from the midstream reading device 17 to the sixth SoC 4 correspond to the three (3) units of master data stored in the storages 42 in the fourth through sixth SoCs 4, respectively, and the three (3) units of read data transmitted from the midstream reading device 17 to the ninth SoC 4 correspond to the three (3) units of master data stored in the storages 42 in the seventh through ninth SoCs 4, respectively.

The units of read data received by the (m+2)th SoC 4 may be passed onto the (m+1)th SoC 4 and thereafter to the m-th SoC 4, as will be described further below. Each unit of read data is a minimum data unit to be compared with the unit of master data stored in each SoC 4 having the same identifying information appended to the read data. Therefore, a volume of the data to be passed through the SoCs 4 may be reduced, and the communication load may be reduced.

If the image recorded on the sheet 21 by the K-th head 16 does not contain a defect, the unit of read data with the identifying information of the K-th SoC 4 appended thereto is equal to the unit of master data stored in the K-th SoC 4. In other words, if the read data differs from the master data, it may be considered that the image contains a defect. In order to detect the defect, the master data and the read data may be compared in the manner described below.

FIG. 5 is a block diagram to illustrate a configuration for detecting a defect in an image. Each SoC 4 has a comparing unit 43 and a compressing unit 44. The comparing unit 43 may compare the master data and the read data to generate deferential data. When, for example, each of the master data and the read data is a unit of 16-digit binary numbers, the comparing unit 43 may perform an exclusive OR operation on each value in the bits in the read data and on each value in the bits in the master data. The result from the computation is also a unit of 16-digit binary number.

When the image does not contain a defect, theoretically, the values in the read data and the values in the master data are equal, and the values of the bits in the differential data are all zero (0). In contrast, when the image contains a defect, the values in the read data and the values in the master data are different; therefore, at least one of the values in the bits in the differential data indicates one (1). However, practically, not all the values in the bits in the differential data may indicate zero (0) even when the image does not contain a defect. In other words, some values in the bits in the differential data may indicate one (1) even when the image contains no defect. In this regard, it may be determined that the image contains no defect when, for example, a number of the values of bits indicating zero (0) in the differential data is larger than or equal to a predetermined number.

A volume of data in the differential data is equal to the volume of data in the master data and the volume of data in the read data and may be substantially large. Therefore, the compressing unit 44 may compress the differential data. A volume of data in the compressed differential data may be smaller than or equal to the volume of data in the uncompressed differential data.

FIGS. 6-7 are flowcharts to illustrate a data-exchange process to be executed in each of the SoCs 4. As shown in FIG. 6, the controller 41 in the SoC 4 determines whether unit(s) of read data unit is passed from either the reading device 17 or the downstream SoC 4 (S21). If the controller 41 determines that no read data is passed thereto (S21: NO), the controller 41 repeats S21. If the controller 41 determines that unit(s) of read data is passed thereto (S21: YES), the controller 41 stores the received read data in the storage 42.

The controller 41 determines whether at least one of the units of read data stored in the storage 42 has identifying information, which is different from its own identifying information (S23). In other words, the controller 41 determines whether the controller 41 received unit(s) of read data addressed to the other SoCs 4 than the unit of read data addressed to itself. If the controller 41 determines that the controller 41 received unit(s) of read data addressed to the other SoC(s) 4 (S23: YES), the controller 41 passes the unit(s) of read data addressed to the other SoC(s) 4, among all of the units of read data stored in the storage 42, to the upstream SoC 4 (S24). The controller 41 deletes the unit(s) of read data addressed to the other SoC(s) 4 from the storage (S25). In other words, the controller 41 saves the unit of read data addressed to itself.

Following S25, or if the controller 41 determines that the controller 41 did not receive unit(s) of read data addressed to the other SoC(s) 4 (S23: NO), the controller 41 proceeds to S26, which will be described later. Optionally, the controller 41 may pass all the units of read data received in S21 to the upstream SoC 4; however, the controller 41 may reduce a volume of the data to be passed to the upstream SoC 4 by omitting the unit of read data addressed thereto, and communication load may be reduced.

The controller 41 inputs the unit of master data addressed thereto and the unit of read data addressed thereto in the comparing unit 43 to compare (S26). The comparing unit 43 provided with the master data and the read data generates a unit of differential data as a result of the comparison. In S26, the controller 41 reads the unit of master data addressed thereto stored in the storage 42 and inputs the unit of master data to the comparing unit 43. In other words, the controller 41 may not need to transmit or receive the master data in S26 with another device outside the SoC 4. Thus, communication load may be reduced.

Following S26, as shown in FIG. 7, the controller 41 appends its own identifying information to the differential data generated by the comparing unit 43 (S31). Optionally, the identifying information of the SoC 4 may be appended to the differential data by the comparing unit 43. Following S31, the controller inputs the differential data in the compressing unit 44 to compress (S32). The compressing unit 44 compresses the differential data input by the controller 41. Optionally, the identifying information of the SoC 4 may be appended to the differentia data by the compressing unit 44. Moreover, optionally, the identifying information of the SoC 4 may be appended to the compressed differential data by the controller 41 or by the compressing unit 44.

The controller 41 determines whether the present SoC 4, to which the controller 41 belongs, is the most downstream SoC 4 (S33). The controller 41 may determine that the present SoC 4 is the most downstream SoC 4 when the identifying information appended thereto includes information indicating that the SoC 4 is the most downstream SoC 4. If the controller 41 determines that the present SoC 4 is the most downstream SoC 4 (S33: YES), the controller 41 passes the differential data compressed by the compressing unit 44 to the upstream SoC 4 (S34).

If the controller determines the present SoC 4 is not the most downstream SoC 4 (S33: NO), the controller 41 determines whether the controller 41 received the compressed differential data from the downstream SoC 4 (S35). If the controller 41 does not have the compressed differential data received from the downstream SoC 4 (S35: NO), the controller 41 repeats S35.

If the controller 41 has the compressed differential data received from the downstream SoC 4 (S35: YES), the controller 41 passes the differential data received from the downstream SoC 4 together with the differential data compressed by the compressing unit 44 to the upstream SoC 4 or to the main controlling circuit 3 (S36). Thus, the differential data is compressed; therefore, in S34 or S36, the volume of the data to be transmitted between the SoCs 4 or between the SoC 4 and the main controlling circuit 3 may be reduced, and the communication load may be reduced. Following S34 or S36, the controller 41 deletes the unit of master data and the unit of read data addressed thereto from the storage 42 (S37) and ends the data-exchange process.

Following S32, optionally, the controller 41 may pass the differential data compressed by the compressing unit 44 to the upstream SoC 4 or to the main controlling circuit 3 without awaiting the compressed data to be received from the downstream SoC 4. In this arrangement, in S36, the controller 41 may pass the differential data received from the downstream SoC 4 to the upstream SoC 4. In S23, if the controller 41 determines that the controller 41 received the read data addressed to the other SoCs 4 (S23: YES), optionally, the controller 41 may conduct the process in S24 simultaneously when the controller 41 conducts the process in S36. In other words, the controller 41 may pass the differential data received from the downstream SoC 4, the differential data compressed by the compressing unit 44, and the read data addressed to the other SoCs 4, collectively to the upstream SoC 4.

According to the data-exchange process as described above, the main controlling circuit 3 may receive the units of differential data generated and compressed in the respective SoCs 4. Optionally, when there is no difference between the master data and the read data, for example, a data unit of one (1) bit indicating no difference may be generated as the differential data. In this arrangement, the volume of the data to be passed to the main controlling circuit 3 may be reduced, and the communication load may be reduced.

The main controlling circuit 3 has, as shown in FIG. 5, a decompressing unit 33 and a determining unit 34. The decompressing unit 33 may decompress the compressed differential data. The determining unit 34 may determine whether the image recorded on the sheet 21 contains a defect based on the decompressed differential data. If the differential data indicates that the master data and the read data are equal, the determining unit 34 generates a result of the determination indicating that the image does not contain a defect. If the differential data indicates that the master data and the read data are different, the determining unit 34 generates a result of the determination indicating that the image contains a defect. The main controlling circuit 3 may receive nine (9) units of differential data; therefore, the decompressing unit 33 may decompress each unit of differential data, and the determining unit 34 may generate nine (9) results of determinations corresponding to the nine units of differential data.

FIG. 8 is a flowchart to illustrate a determining flow to be conducted by the main controlling circuit 3. The controller 31 in the main controlling circuit 3 determines whether the units of differential data are received from the most upstream SoC 4 (S41). If the controller 31 determines that the differential data is not received (S41: NO), the controller 31 repeats S41. If the controller 31 determines that the units of differential data are received (S41: YES), the controller 31 inputs all of the received units of differential data in the decompressing unit 33 to decompress (S42). Next, the controller 31 inputs the units of differential data decompressed by the decompressing unit 33 in the determining unit 34 to determine whether the image recorded on the sheet 21 contains a defect (S43).

Following S43, the controller 31 determines at least one of the nine determination results generated by the determining unit 34 indicates a defect in the image (S44). If none of the nine determination results indicates that a defect is contained in the image (S44: NO), the image recorded on the sheet 21 may not contain a defect. The controller 31 ends the determining process. If at least one of the nine determination results indicates a defect is contained in the image (S44: YES), the image recorded on the sheet 21 may contain at least one defect. Therefore, the controller 31 operates a display (not shown) in the printing apparatus 1 to display text and/or a sign that alerts the user that the image contains a defect. The controller 31 ends the determining process.

The user alerted that the image contains a defect may visually inspect the image on the sheet 21 and determine whether the defect in the image is tolerable. If the user finds the defect tolerable, the user may continuously use the printing apparatus 1. On the other hand, if the user finds the defect intolerable, the user may suspend using the printing apparatus 1 and work to clear the cause of the defect.

Meanwhile, the printing apparatus 1 may not necessarily operate the display for alerting the user that the image contains a defect. For example, the printing apparatus 1 may additionally record an image indicating that the image contains the defect on the same sheet 21 as the sheet 21, on which the image with the defect is recorded. For another example, the printing apparatus 1 may record the image based on the same master image data on a new sheet 21. In other words, the printing apparatus may repeat recording of the same image on a new sheet 21. When the printing apparatus 1 repeats recording of the same image, the nine units of master data may be provided once again from the master transmitter 32 to the most upstream SoC 4. Accordingly, the SoCs 4 may repeat the printing process as shown in FIG. 4 and the data-exchange process as shown in FIGS. 6-7.

It may be preferable that the differential data indicating that the master data and the read data are different is saved in a storage (not shown) provided in, for example, the printing apparatus 1. With the differential data saved in the storage, a maintenance operator may identify the head 16 that caused the defect based on the identifying information appended to the saved differential data.

According to the printing apparatus 1 described above, the nine SoCs 4 each generate the differential data indicating a difference or no difference between the master data and the read data. Therefore, the main controlling circuit 3 may not need to generate the differential data, and the computing load on the main controlling circuit 3 may be reduced. Moreover, the volume of the data to be processed in the printing apparatus 1 may be reduced; therefore, noise that may be caused by the data exchange may be reduced. As described above, for generating the differential data, the master data stored in the storage 42 in each SoC 4 is used; therefore, the master data may not necessarily be exchanged with the main controlling circuit 3 for generating the differential data. In this regard, while one may consider that the processes to generate the differential data by the nine SoCs 4 is merely a substitute of the main controlling circuit 3 concentratively generating the differential data, it should be noted that the printing apparatus 1 in the present disclosure is not equal to such a substitution.

In the present embodiment described above, the three (3) reading devices 17 and the nine (9) SoCs 4 are in the arrangement such that the nine SoCs 4 are grouped into three, and each group of three SoCs 4 corresponds to each one of the three reading devices 17. However, the correspondence between the reading devices 17 and the SoCs 4 may not necessarily be limited as above, as long as the quantity N of the reading devices 17 is a natural number, and a quantity M of the SoCs 4 is a natural number greater than or equal to 2N. Moreover, the quantity of the SoCs 4 corresponding to one of the reading devices 17 and the quantity of the SoCs 4 corresponding to another one of the reading devices 17 may be different as long as each group of SoCs 4 includes at least two (2) SoCs 4. In this regard, however, while the read data is passed from the SoCs 4 on the downstream side to the SoCs 4 on the upstream side, the most downstream SoC 4 needs to be connected with one of the reading devices 17, and the SoC 4 connected with the reading device 17 needs to be connected upstream with at least one of the SoCs 4 not connected with the reading device 17.

The quantity of the readers 171 provided in each reading device 17 may not necessarily be equal to the quantity of the SoCs 4 in the group corresponding to the reading device 17. For example, each reading device 17 may have a single reader 171, which may read the image recorded on the sheet 21 and generate data corresponding to the read image, and the single reader 171 may divide the generated data into a plurality of units of read data to be provided to the SoCs 4, of which quantity is equal to the quantity of units of read data.

The read data and the differential data may not necessarily be passed from the SoCs 4 on the downstream side to the SoCs 4 on the upstream side but may optionally be passed from the SoCs 4 on the upstream side to the SoCs 4 on the downstream side. In the arrangement where the read data and the differential data are passed from the SoCs 4 on the upstream side to the SoCs 4 on the downstream side, the most downstream SoC 4 may be connected directly to the main controlling circuit 3, and the differential data may be passed from the most downstream SoC 4 to the main controlling circuit 3. Further, the most upstream SoC 4 needs to be connected with one of the reading devices 17, and the SoC 4 connected with the reading device 17 needs to be connected downstream to at least one of the SoCs 4 not connected with the reading device 17.

Next, second through fifth embodiments of the printing apparatus 1 and the method for determining will be described below. In the embodiments described below, items that are substantially similar to those described above will be referred to by the same reference signs, and description of those items is herein omitted.

Second Embodiment

FIG. 9 is a block diagram to schematically illustrate a configuration of the printing apparatus 1 according to the second embodiment. While the main controlling circuit 3 in the first embodiment has the decompressing unit 33 and the determining unit 34, and each SoC 4 has the compressing unit 44, the main controlling circuit 3 in the second embodiment has neither the decompressing unit 33 nor the determining unit 34, while each SoC 4 has a determining unit 45 in place of the compressing unit 44.

The determining unit 45 may receive the differential data from the comparing unit 43 in the present SoC 4, to which the determining unit 45 belongs, determine whether the image recorded on the sheet 21 contains a defect based on the received differential data, and generate a determination result. The determining unit 45 receiving the differential data, indicating that the master data and the read data are equal, may generate a determination result indicating that the image does not contain a defect. On the other hand, the determining unit 45 receiving the differential data, indicating that the master data and the read data are different, may generate a determination result indicating that the image contains a defect. The determination result may be, for example, a data unit of one (1) bit indicating presence or absence of a defect, and a data volume of the determination result may be smaller than or equal to a data volume of the differential data.

FIG. 10 is a flowchart to illustrate a part of a data-exchange process to be executed in the SoCs 4, which may be conducted in place of S31-S37 in FIG. 7. The controller 41 in each SoC 4 may conduct the processes S21-S26 as shown in FIG. 6. Following S26, the controller 41 proceeds to S51 shown in FIG. 10. In S51, the controller 41 1 inputs the differential data generated by the comparing unit 43 in the determining unit 45 to determine whether a part of the image recorded on the sheet 21 by the head 16 that corresponds to the controller 41 contains a defect. In S52, the controller 41 appends identifying information assigned thereto to the determination result generated by the determining unit 45 (S52). Following S52, the controller 41 determines whether the present SoC 4 is the most downstream SoC 4 (S53). The process in S53 is similar to the process in S33 (see FIG. 7).

If the controller 41 determines that the present SoC 4 is the most downstream SoC 4 (S53: YES), the controller 41 passes the determination result to the upstream SoC 4 (S54). If the controller determines the present SoC 4 is not the most downstream SoC 4 (S53: NO), the controller 41 determines whether the controller 41 received the determination result from the downstream SoC 4 (S55). If the controller 41 does not have the determination result received from the downstream SoC 4 (S55: NO), the controller 41 repeats S55. If the controller 41 has the determination result received from the downstream SoC 4 (S55: YES), the controller 41 passes the determination result received from the downstream SoC 4 together with the determination result generated by the determining unit 45 in the present SoC 4 to the upstream SoC 4 or to the main controlling circuit 3 (S56). The data volume of the determination results is relatively small; therefore, in S54 or S56, the volume of the data to be transmitted between the SoCs 4 or between the SoC 4 and the main controlling circuit 3 may be reduced, and the communication load may be reduced.

Following S54 or S56, the controller 41 deletes the unit of master data and the unit of read data addressed thereto from the storage 42 (S57) and ends the data-exchange process. As described above, the data-exchange process (FIG. 10) in the second embodiment may be similar to the data-exchange process (see FIGS. 6-7) in the first embodiment described earlier but is different in that the data is passed from downstream to upstream among the SoCs 4.

That is, in the first embodiment, it is the differential data that is passed from downstream to the upstream, but in the second embodiment, it is the determination result that is passed from downstream to upstream. As a result of the data-exchange process shown in FIG. 10, nine (9) determination results are passed from the most upstream SoC 4 to the main controlling circuit 3.

FIG. 11 is a flowchart to illustrate a determining flow to be conducted by the main controlling circuit 3. The controller 31 in the main controlling circuit 3 determines whether the determination results are received from the most upstream SoC 4 (S61). If the controller 31 determines that the determination results are not received (S61: NO), the controller 31 repeats S61.

If the controller 31 determines that the determination results are received (S61: YES), the controller 31 determines at least one of the nine determination results received in S61 indicates a defect in the image (S62). If the nine determination results all indicate that no defect is contained in the image (S62: NO), the image recorded on the sheet 21 may not contain a defect. The controller 31 ends the determining process. If at least one of the nine determination results indicates a defect is contained in the image (S62: YES), the image recorded on the sheet 21 may contain at least one defect. Therefore, the controller 31 alerts the user that the image contains a defect, similarly to S45 in FIG. 8. The controller 31 ends the determining process.

The determining process shown in FIG. 11 may be similar to the determining process shown in FIG. 8 but may be simpler than the determining process shown in FIG. 8. Therefore, computing load on the main controlling circuit 3 conducting the determining process shown in FIG. 11 may be smaller than the computing load on the main controlling circuit 3 conducting the determining process shown in FIG. 8. It may be preferable that the determination results indicating that image contains a defect is saved in a storage (not shown) provided in, for example, the printing apparatus 1. With the determination results saved in the storage, a maintenance operator may identify the head 16 that caused the defect based on the identifying information appended to the saved determination result.

According to the printing apparatus 1 described above, the computing load on the main controlling circuit 3 may be reduced even to be lower than the load in the first embodiment. Moreover, the volume of the data to be exchanged may be reduced even to be lower; therefore, noise that may be caused by the data exchange may be reduced even to be lower. In the present embodiment, the read data and the determination results may be passed from the SoCs 4 on the downstream side to the SoCs 4 on the upstream side; however, optionally, the read data and the determination results may be passed from the SoCs 4 on the upstream side to the SoCs 4 on the downstream side. In the arrangement where the read data and the determination results are passed from the SoCs 4 on the upstream side to the SoCs 4 on the downstream side, the most downstream SoC 4 may be connected directly to the main controlling circuit 3, and the determination results may be passed from the most downstream SoC 4 to the main controlling circuit 3.

Third Embodiment

FIG. 12 is a block diagram to schematically illustrate a configuration of the printing apparatus 1 according to the third embodiment of the present disclosure. A hardware configuration of the printing apparatus 1 in the third embodiment may be substantially similar to the hardware configuration of the printing apparatus 1 in the first and second embodiments but is different in that the printing apparatus 1 in the third embodiment has nine (9) reading devices 18 rather than the three (3) reading devices 17, and the nine reading devices 18 are connected to the nine SoCs 4 in one-to-one correspondence. Therefore, the printing apparatus 1 in the third embodiment has nine (9) communication cables for exchanging data between the reading devices 18 and the SoCs 4.

Each reading device 18 may read an image in a range in the image recorded on the sheet 21 by the head 16 connected to the corresponding SoC 4. While the nine reading devices 18 may correspond to the nine readers 171 in the first embodiment, the reading devices 18 may not need to append the identifying information of the SoCs 4 to the read data generated by the reading device 18. Therefore, computing loads on the reading devices 18 may be reduced.

While the controller 41 in each SoC 4 may conduct the data-exchange process shown in FIGS. 6-7 or the data-exchange process shown in FIGS. 6 and 10, the processes S23-S25 in FIG. 6 may not need to be conducted. The controller 41 may, when the controller 41 determines in S22 that the read data has the read data passed from the reading device 18 in S21, proceed to the process in S26. Accordingly, the computing loads on the SoCs 4 may be reduced, and communication loads between the SoCs 4 and between the SoC 4 and the main controlling circuit 3 may be reduced.

Fourth Embodiment

FIG. 13 is a block diagram to schematically illustrate a configuration of a printing apparatus 1 according to the fourth embodiment of the present disclosure. A hardware configuration of the printing apparatus 1 in the fourth embodiment may be substantially similar to the hardware configuration of the printing apparatus 1 in the first embodiment but is different in that the main controlling circuit 3 in the fourth embodiment has a data generating unit 35.

The controller 31 in the main controlling circuit 3 inputs the master image data, which is also input in the master transmitter 32, to the data generating unit 35. Based on the master image data input by the controller 31, the data generating unit 35 generates data to be used to correct the differential data and divides the generated data into nine (9) units of determining data according to the same protocol as the master transmitter 32 dividing the master image data. The nine units of determining data correspond to the nine units of master data generated by the master transmitter 32. The data generating unit 35 appends the same identifying information as the identifying information appended to the corresponding unit of master data to each of the units of determining data.

The controller 31 inputs the nine units of determining data with the identifying information appended thereto into the determining unit 34. The determining unit 34 corrects each unit of the differential data decompressed by the decompressing unit 33 with use of the determining data having the same identifying information as the identifying information appended to the differential data and, based on the corrected differential data, determine whether the image recorded on the sheet 21 contains a defect.

FIGS. 14A-14B are schematic diagrams to illustrate the differential data. FIG. 14A illustrates the image recorded on the sheet 21. In virtual regions 211, 213, specifically important parts of the image to be recorded on the sheet 21 are located. In a virtual region 212 on the sheet 21, a relatively unimportant part of the image to be recorded on the sheet 21 is located. The region 211 is separated from the regions 212, 213, while the regions 212, 213 adjoin each other.

The specifically important part of the image is a part, in which irregularities such as blank spot, smears, stains, etc., may not be tolerated, and may be, for example, a notable feature such as a logo, two-dimensional barcode, etc. The relatively unimportant part is a part, in which the irregularities may be tolerated, and may be, for example, figures such as serial numbers that are unexceptional or recognizable to human eyes even with blank spots or smears.

The image recorded on the sheet 21 has a spot 214 sitting over a border of the region 211 and a spot 215 sitting over a border of the region 211. The spot 214 may be small but is partly located inside the region 211, in which spots may not be tolerated. The spot 215 may be large but is located outside the regions 211, 213 at a position, in which spots may be tolerated.

FIG. 14B illustrates the differential data for the image shown in FIG. 14A. Bit values corresponding to the spots 214, 215 are "1," indicating that there is a difference between the master data and the read data. Bit values corresponding to the remainder of the image on the sheet 21 are "0," indicating that there is no difference between the master data and the read data. In the example of FIG. 14A, the spot 214 is partly located in the region, in which the spots may not be tolerated. Therefore, the controller 31 may determine that the image recorded on the sheet 21 contains a defect. Meanwhile, the spot 215 is located in the region, in which spots may be tolerated. Therefore, if the spot 214 does not exist, in other words, with the spot 215 alone, it may not be preferable that the controller 31 determines the image recorded on the sheet 21 contains a defect.

FIGS. 15A-15B are schematic diagrams to illustrate the determining data. FIG. 15A illustrates the determining data. Bit values corresponding to the regions 211, 213, in which spots may not be tolerated, on the sheet 21 are all "1," which means the difference between the master data and the read data are not ignored. Bit values corresponding to the region outside the regions 211, 213, in which spots may be tolerated, i.e., the region with hatching in FIG. 15A, are all "0," which means the difference between the master data and the read data is ignored.

The determining unit 34 may correct the differential data with use of the determining data by calculating the logical AND of each bit value in the differential data and each bit value in the determining data. FIG. 15B illustrates an example of the differential data after the correction. As shown in FIG. 15B, the bit value corresponding to the part of the spot 214 located inside the region 211 is "1" whereas the bit values in the remainder area are all "0." Accordingly, the controller 31 may determine that the image recorded on the sheet 21 contains a defect. If, for example, the spot 214 does not exist on the sheet 21, the controller 31 might determine that the image recorded on the sheet 21 does not contain a defect.

According to the printing apparatus 1 described above, the determination whether the image contains a defect may be made solely based on a significant difference between the master data and the read data. While the determining data is generated based on the master image data each time the master image data is input by the controller 31; therefore, an actual appearance of the image recorded on the sheet 21 may be reflected to correct the differential data. Protocols and criteria to generate the determining data based on the master image data are provided in advance to the data generating unit 35. Optionally, options of the protocols and the criteria may be prepared in advance in the printing apparatus 1, and the user may select one(s) of the options and provide selected option(s) to the data generating unit 35.

Fifth Embodiment

A hardware configuration of the printing apparatus 1 in the fifth embodiment may be substantially similar to the hardware configuration of the printing apparatus 1 in the first embodiment. The determining unit 34 is in advance provided with criteria to correct the differential data, which is decompressed by the decompressing unit 33.

Figures 16A, 16B:
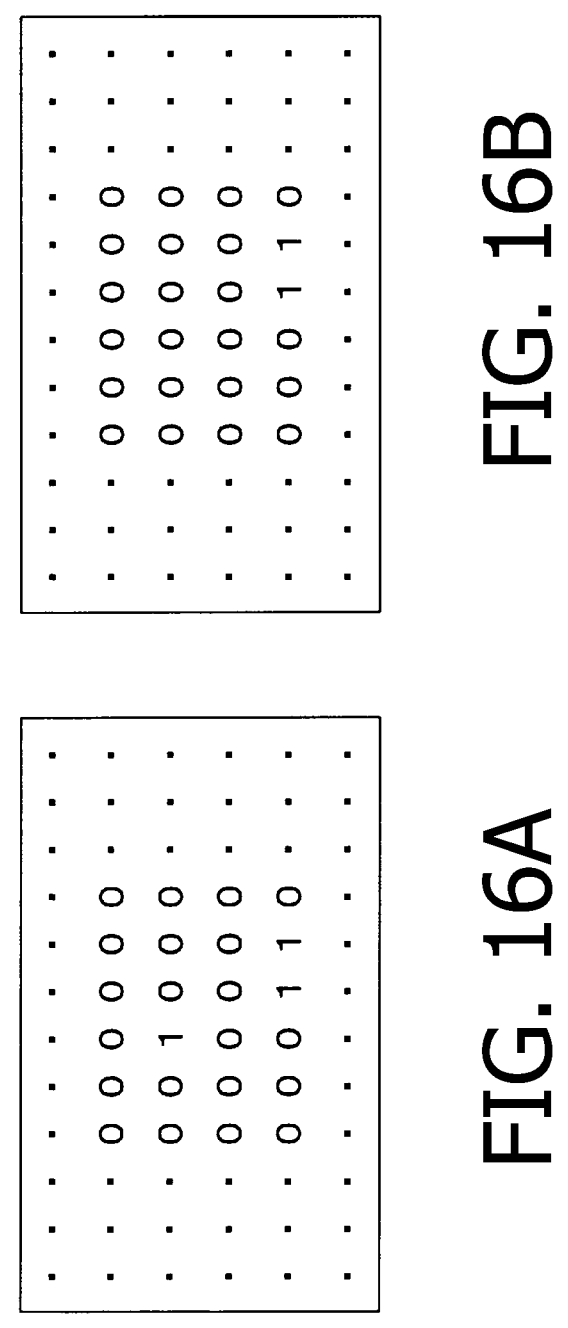

FIGS. 16A-16B are schematic diagrams to illustrate the differential data to be used in the printing apparatus 1. FIG. 16A illustrates an example of the differential data before correction. In many cases, minor defects such as smaller blank spots and stains may be tolerable. For example, while a value in a first bit indicates "1," values in two bits that directly adjoin the first bit on one side and the other side, e.g., on the right and the left, may indicate "0." In this case, the difference in the area corresponding to the first bit may be considered to be a minor defect and may be ignored. Therefore, the determining unit 34 may replace the value "1" in the first bit with "0."

For another example, while a value in a third bit is "1," at least one of fourth bits that directly adjoin the first bit on the right and the left may be "1." In this case, the difference in the area corresponding to the third bit may not be a minor defect to be ignored. Therefore, the determining unit 34 may maintain the value "1" in the third bit without changing.

FIG. 16B illustrates an example of the differential data after the correction. In the differential data shown in FIG. 16B, the information included in the differential data as shown in FIG. 16A, which indicates that the minor defect is contained in the image, in the former example is ignored.

According to the printing apparatus 1 as described above, when the area, which is different between the master data and the read data, satisfies a predetermined condition, the determining unit 34 may ignore the difference when determining whether the image contains a defect. Therefore, the determining unit 34 may determine whether the image contains a defect based on the significant difference between the master data and the read data. The criteria may be given in advance; therefore, it is not necessary to generate data to refer to in order determine whether the difference is significant or not each time. In other words, the computing load may be reduced.

According to the fifth embodiment, the criteria to determine whether the difference may be ignored includes a condition that a value of a bit is "1", and values of bits adjoining the bit having the value "1" on the right and the left are "0. However, the criteria to determine whether the difference may be ignored may not necessarily be limited. For example, the criteria may include a condition, where a range in which the bit value "1" continuously appears is smaller than a predetermined size, and a condition where the area corresponding to the bit value "1" is located in a peripheral area in the sheet 21.

Optionally, options of the criteria may be prepared in advance in the printing apparatus 1, and the user may select one(s) of the options and provide selected option(s) to the determining unit 34. According to the present embodiment, the determining unit 34 may correct the differential data; however, the differential data may not necessarily be corrected by the determining unit 34. Optionally, the comparing unit 43 in each of the SoCs 4 generating the differential data by comparing the master data and the read data may correct the generated differential data in the manner described above. For another example, either the comparing unit 43 or the determining unit 45 in each of the SoCs 4 in the printing apparatus 1 in the second embodiment may correct the generated differential data in the manner described above.

Sixth Embodiment

FIG. 17 is a block diagram to schematically illustrate a configuration of a printing apparatus 1 in the sixth embodiment. A hardware configuration of the printing apparatus 1 in the sixth embodiment may be substantially similar to the hardware configuration of the printing apparatus 1 in the second embodiment but is different in that the main controlling circuit 3 in the sixth embodiment has the data generating unit 35.

The data generating unit 35 may generate nine (9) units of determining data, similarly to the data generating unit 35 in the fourth embodiment. Moreover, the data generating unit 35 may pass the nine units of determining data to the most upstream SoC 4, similarly to the master transmitter 32 transmitting the nine units of master data to the most upstream SoC 4.

The nine SoCs 4 may pass the determining data received by the most upstream SoC 4 sequentially to the most downstream SoC 4, similarly to the master data passed through the SoCs 4.

The determining data may be passed through the SoCs 4 to the most downstream SoC 4 after the nine units of master data are passed downstream to the most downstream SoC 4. Optionally, the master data and the determining data may be passed downstream substantially simultaneously.

The determining data may be stored in the storage 42 in each SoC 4. The controller 41 in the SoC 4 may input the determining data, with the identifying information appended thereto, in the determining unit 45. The determining unit 45 may correct the differential data with use of the determining data being input by the controller 41, in the manner described in the fourth embodiment. Optionally, the determining data may be input from the storage 42 to the comparing unit 43, and the comparing unit 43 may compare the master data and the read data to generate the differential data, and correct the generated differential data with use of the determining data. Optionally, each unit of differential data may be corrected with use of the determining data, as described in the fourth and sixth embodiments, and may further be corrected with reference to the criteria described in the fifth embodiment.

According to the printing apparatus 1 described above, similarly to the printing apparatus 1 in the fourth embodiment, the determination whether the image contains a defect may be made based on a substantially significant difference between the master data and the read data.

According to the method to determine whether the image recorded by the printing apparatus 1 as described in the first through sixth embodiments contains a defect, the printing apparatus 1 may not necessarily be equipped with a device, e.g., the reading devices 17, 18, to generate the read data. For example, the SoCs 4 may generate the differential data in either hardware device or in software configuration. For another example, the determination based on the differential data whether the image contains a defect may be made by any of the SoCs 4, the main controlling circuit 3, or other circuit. Therefore, a degree of freedom in designing the printing apparatus 1 may be increased.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents.

What is claimed is:

1. A printing apparatus, comprising:
    a plurality of heads configured to record an image;
    a plurality of head controlling circuits connected to the plurality of heads in one-to-one correspondence, the plurality of head controlling circuits being connected with one another serially, each of the plurality of head controlling circuits being configured to control a corresponding one of the plurality of heads to record a part of the image based on master data;
    a master transmitter configured to transmit the master data to a most upstream one of the plurality of head controlling circuits; and
    a determining unit configured to determine whether the recorded image contains a defect, wherein
    the plurality of head controlling circuits are configured to:
        pass the master data received by the most upstream one of the plurality of head controlling circuits serially downstream onto a most downstream one of the plurality of head controlling circuits, and
        generate differential data indicating a difference between the master data and read data generated by reading the recorded image, and
    the determining unit is configured to determine whether the recorded image contains the defect based on the differential data.

2. The printing apparatus according to claim 1, further comprising a reading device configured to read the recorded image and generate the read data, wherein
    each of the plurality of head controlling circuits has unique identifying information assigned in advance,
    the master transmitter is configured to:
        generate a plurality of units of master data by dividing master image data, the master image data composing an entirety of the image to be recorded,
        transmit the plurality of units of master data, to each of which the identifying information of an addressed one of the plurality of head controlling circuits is appended, to the most upstream one of the plurality of head controlling circuits,
    each of the plurality of head controlling circuits is configured to:
        in a case where the head controlling circuit receives one of the plurality of units of master data, to which the identifying information of itself is appended, and at least one of the plurality of units of master data, to which the identifying information of at least one of the plurality of head controlling circuits other than itself is appended, pass the at least one of the plurality of units of master data downstream to one of the plurality of head controlling circuits connected therewith,
        store the one of the plurality of units of master data, to which the identifying information of itself is appended, in a storage, control the corresponding one of the plurality of heads to record the part of the image based on the stored one of the plurality of units of master data, and generate the differential data indicating a difference between the stored one of the plurality of units of master data and the read data generated by the reading device.

3. The printing apparatus according to claim 2, wherein a quantity of the reading device is N, N being a natural number, a quantity of the head controlling circuits is M, M being a natural number greater than or equal to 2N, the N reading device is connected with N of the head controlling circuits including the most downstream one of the plurality of head controlling circuits in one-to-one correspondence, each of the N of the head controlling circuits connected with the reading device is connected upstream with at least one of the plurality of head controlling circuits not connected with any of the N reading device, each of the N reading device is configured to generate a plurality of units of read data by reading the part of the image, append the identifying information assigned to one of the N of the head controlling circuits connected therewith and the at least one of the plurality of head controlling circuits not connected with any of the N reading device to each of the plurality of units of read data, and pass the plurality of units of read data with the identifying information to the one of the N of the head controlling circuits connected therewith, each of the plurality of head controlling circuits is configured to:

in a case where the head controlling circuit receives one of the plurality of units of read data, to which the identifying information assigned thereto is appended, and at least one of the plurality of units of read data, to which the identifying information of at least one of the controlling circuits other than itself is appended, pass the at least one of the plurality of units of read data upstream to one of the plurality of head controlling circuits connected therewith, and generate the differential data indicating a difference between the stored one of the plurality of units of master data and the one of the plurality of units of read data, to which the identifying information assigned thereto is appended.

4. The printing apparatus according to claim 2, comprising a plurality of reading devices, each of which is the reading device, the plurality of reading devices being connected with the plurality of head controlling circuits in one-to-one correspondence, wherein each of the plurality of reading devices is configured to pass the read data generated by reading the part of the image to a corresponding one of the plurality of head controlling circuits connected therewith, and each of the plurality of head controlling circuits is configured to generate the differential data indicating a difference between the stored one of the plurality of units of master data and the read data received from a corresponding one of the plurality of reading devices connected therewith.

5. The printing apparatus according to claim 3, further comprising a main controlling circuit having the master transmitter and the determining unit, wherein each of the plurality of head controlling circuits except the most upstream one of the plurality of head controlling circuits is configured to:

append the identifying information assigned thereto to the generated differential data and pass the differential data with the identifying information upstream to the one of the plurality of head controlling circuits connected therewith, and in a case where the head controlling circuit receives the differential data from the one of the plurality of head controlling circuits connected downstream therewith, pass the received differential data upstream to the one of the plurality of head controlling circuits connected therewith, the most upstream one of the plurality of head controlling circuits is configured to:

append the identifying information assigned thereto to the generated differential data and pass the differential data with the identifying information to the main controlling circuit, and pass the differential data received from the one of the plurality of head controlling circuits connected downstream therewith to the main controlling circuit, and the determining unit is configured to determine whether the recorded image contains the defect based on the differential data received in the main controlling circuit from the most upstream one of the plurality of head controlling circuits.

6. The printing apparatus according to claim 5, wherein each of the plurality of head controlling circuits is configured to compress the differential data generated by itself and pass the compressed differential data upstream to one of the main controlling circuit or the one of the plurality of head controlling circuits connected therewith, the main controlling circuit is configured to decompress the differential data received from the most upstream one of the plurality of head controlling circuits, and the determining unit is configured to determine whether the recorded image contains the defect based on the differential data decompressed by the main controlling circuit.

7. The printing apparatus according to claim 3, further comprising a main controlling circuit having the master transmitter, wherein each of the plurality of head controlling circuits has the determining unit, the determining unit is configured to determine whether the recorded image contains a defect based on the differential data generated by the head controlling circuit, to which the determining unit belongs, each of the plurality of head controlling circuits except the most upstream one of the plurality of head controlling circuits is configured to:

append the identifying information assigned thereto to a result of determination made by the determining unit belonging to itself and pass the result with the identifying information upstream to the one of the plurality of head controlling circuits connected therewith, in a case where the head controlling circuit receives the result of determination from the one of the plurality of head controlling circuits connected downstream therewith, pass the received result upstream to the one of the plurality of head controlling circuits connected therewith, the most upstream one of the plurality of head controlling circuits is configured to:

append the identifying information assigned thereto to a result of determination made by the determining unit belonging to itself and pass the result with the identifying information to the main controlling circuit, and pass the result received from the one of the plurality of head controlling circuits connected downstream therewith to the main controlling circuit.

8. The printing apparatus according to claim 1, further comprising a data generating unit configured to generate determining data based on the master data, the determining data including information indicating an area in the image, in which the difference between the master data and the read data is ignorable, wherein the differential data includes information indicating an area in the image, in which the master data and the read data are different, in a case where the area, in which the master data and the read data are different, indicated by the information included in the differential data, matches the area, in which the difference between the master data and the read data is ignorable, indicated in the information included in the determining data, the determining unit is configured to determine whether the recorded image contains the defect with disregard for the difference between the master data and the read data indicated by the differential data.

9. The printing apparatus according to claim 1, wherein the differential data includes information indicating an area in the image, in which the master data and the read data are different, in a case where the area, in which the master data and the read data are different, satisfies a predetermined criterion, the determining unit is configured to determine whether the recorded image contains the defect with disregard for the difference.

10. A method for determining whether an image recorded by a printing apparatus contains a defect, the printing apparatus comprising:

a plurality of heads configured to record an image;

a plurality of head controlling circuits connected to the plurality of heads in one-to-one correspondence, the plurality of head controlling circuits being connected with one another serially, each of the plurality of head controlling circuits being configured to control a corresponding one of the plurality of heads to record a part of the image based on master data; and a master transmitter configured to transmit the master data to a most upstream one of the plurality of head controlling circuits, the method comprising:

passing the master data received by the most upstream one of the plurality of head controlling circuits serially downstream onto a most downstream one of the plurality of head controlling circuits, causing each of the plurality of head controlling circuits to generate differential data indicating a difference between the master data and read data, the read data being generated by reading the recorded image, and determining whether the recorded image contains the defect based on the differential data.

* * * * *